(12) United States Patent
Tamaru

(10) Patent No.: US 8,106,995 B2
(45) Date of Patent: Jan. 31, 2012

(54) IMAGE-TAKING METHOD AND APPARATUS

(75) Inventor: Masaya Tamaru, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 495 days.

(21) Appl. No.: 12/244,542

(22) Filed: Oct. 2, 2008

(65) Prior Publication Data

US 2009/0091633 A1 Apr. 9, 2009

(30) Foreign Application Priority Data

Oct. 5, 2007 (JP) .................................. 2007-262504

(51) Int. Cl.
 *H04N 5/232* (2006.01)
(52) U.S. Cl. ........................ 348/345; 348/349
(58) Field of Classification Search .................. 348/345, 348/349
 See application file for complete search history.

(56) References Cited

U.S. PATENT DOCUMENTS

| | | | |
|---|---|---|---|
| 6,556,246 B1 * | 4/2003 | Suda .............................. | 348/352 |
| 7,362,368 B2 * | 4/2008 | Steinberg et al. ............. | 348/349 |
| 2005/0280733 A1 * | 12/2005 | Imaizumi ...................... | 348/345 |
| 2007/0064145 A1 * | 3/2007 | Sugimoto ...................... | 348/345 |
| 2008/0166117 A1 * | 7/2008 | Li et al. ......................... | 396/121 |

FOREIGN PATENT DOCUMENTS

| | | |
|---|---|---|
| JP | 5-37940 | 2/1993 |
| JP | 11-177873 | 7/1999 |
| JP | 2004-4268 | 1/2004 |
| JP | 2004-20893 | 1/2004 |
| JP | 2004-77517 | 3/2004 |
| JP | 2004-135029 | 4/2004 |
| JP | 2004-135029 A | 4/2004 |
| JP | 2004-163998 | 6/2004 |
| JP | 2004-320287 | 11/2004 |
| JP | 2004-336452 | 11/2004 |
| JP | 2005-128156 | 5/2005 |
| JP | 2005-283637 | 10/2005 |
| JP | 2006-13759 | 1/2006 |
| JP | 2006-18246 | 1/2006 |
| JP | 2006-86952 | 3/2006 |
| JP | 2006-94200 | 4/2006 |
| JP | 2006-227133 | 8/2006 |
| JP | 2007-28486 | 2/2007 |

* cited by examiner

*Primary Examiner* — James Hannett
(74) *Attorney, Agent, or Firm* — Birch, Stewart, Kolasch & Birch, LLP

(57) ABSTRACT

There is provided an image-taking method and apparatus capable of quickly taking an image in which a human face is in focus. When an instruction to take an image is input, multiple images are taken with different focus positions. A human face in each of the images is detected, an area enclosing a detected human face is set as a focus evaluation area, and a focus evaluation value is calculated. Once focus evaluation values for all the images taken have been calculated, the image with the highest focus evaluation value among the images is chosen and recorded. Thus, an image in which the human face is in focus can be readily taken without having to perform cumbersome operations such as an image choosing operation.

18 Claims, 17 Drawing Sheets

FOCUS AREA
(FOCUS EVALUATION AREA)

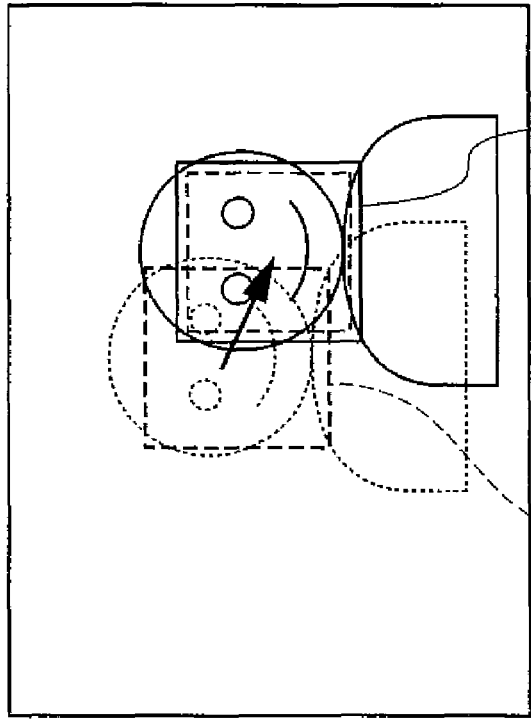
FIG.5A — IMAGE 1 — REFERENCE FOCUS AREA
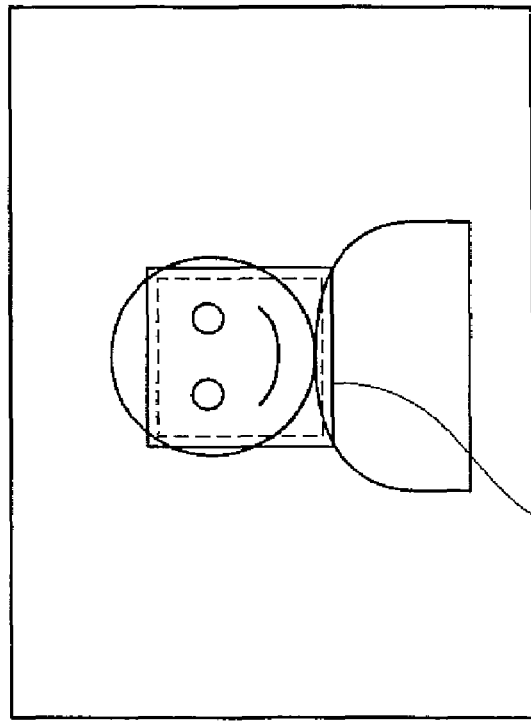
FIG.5B — IMAGE 2 — REFERENCE FOCUS AREA / CORRECTED FOCUS AREA

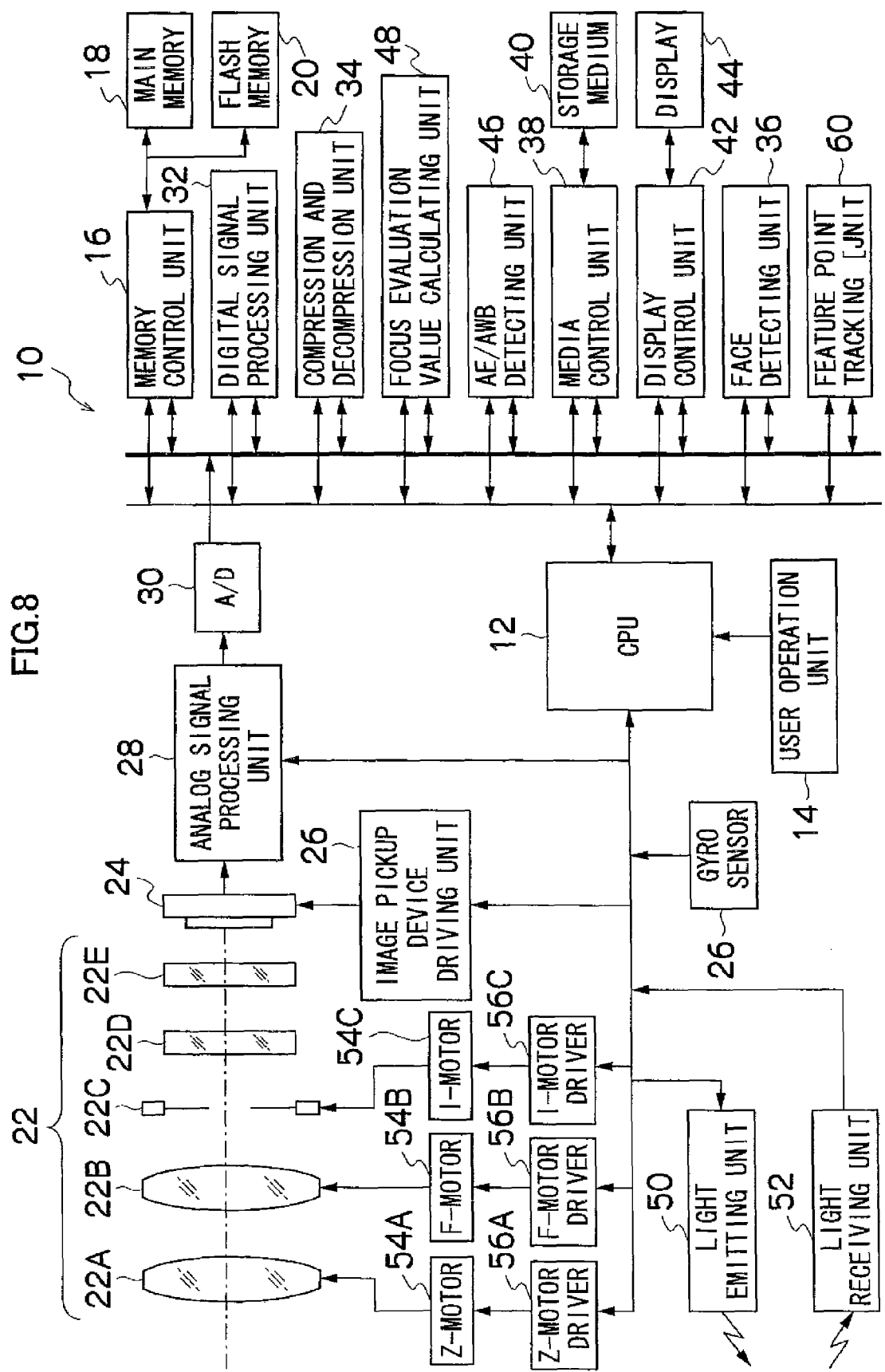

IMAGE 1 (REFERENCE IMAGE)

IMAGE 2 (IMAGE TO BE CORRECTED)

CORRECTED IMAGE

SET FOCUS AREA

IMAGE 1

IMAGE 2

☐ (dashed) HIGHEST FACE EVALUATION VALUE

☐ SECOND HIGHEST FACE EVALUATION VALUE

FIG.11

| IMAGE NUMBER | | IMAGE 1 | IMAGE 2 | IMAGE 3 | IMAGE 4 | IMAGE 5 |
|---|---|---|---|---|---|---|
| FACE EVALUATION VALUE | A | 10 | 6 | 9 | 10 | 9 |
| | B | 6 | 8 | 7 | 7 | 6 |
| | C | 4 | 4 | 4 | 5 | 5 |
| PERSON WITH HIGHEST FACE EVALUATION VALUE | | A | B | A | A | A |

FIG.12

| IMAGE NUMBER | IMAGE 1 | IMAGE 2 | IMAGE 3 | IMAGE 4 | IMAGE 5 | AVERAGE |
|---|---|---|---|---|---|---|
| A | 10 | 8 | 6 | 6 | 7 | 7.4 |
| B | 6 | 6 | 7 | 7 | 6 | 6.4 |
| C | 4 | 4 | 4 | 5 | 5 | 4.4 |

FACE EVALUATION VALUE

IMAGE-TAKING METHOD AND APPARATUS

BACKGROUND OF THE INVENTION

1. Field of the Invention

The present invention relates to an image-taking method and apparatus and, in particular, to an image-taking method and apparatus for taking images of people.

2. Description of the Related Art

Compact digital cameras generally employ contrast auto-focus (AF) system on AF system.

In the contrast AF, in general, focusing is achieved by obtaining focus evaluation values (evaluation values representing the sharpness of images) in a focus evaluation area one by one while moving a focus lens from infinity to a close distance, searching for the peak position of the obtained focus evaluation values, and moving the focus lens to the peak position found, thereby obtaining correct focus.

The contrast AF has a drawback that focusing on a low-contrast subject tends to result in an out-of-focus image because the focusing is based on the contrast of the subject.

In order to solve the problem, a camera has been proposed that includes the function of taking multiple images of the same subject with a single shot while shifting the focus positions (focus bracketing function).

When the focus bracketing function is used to shoot a subject, a process for choosing an image is required after the shooting because multiple images are taken with one shot. The process is typically performed by using a display provided in the camera to check the taken images one by one to determine the degree of focus.

However, the display provided in a camera is small and displays images in a low resolution. Therefore, it is difficult to check a fine degree of focus.

Therefore, Japanese Patent Application Laid-Open No. 2004-135029 proposes a method in which focus evaluation values for images taken by using the focus bracketing function are calculated, the image with the highest focus evaluation value is chosen as the best image, and the chosen image is automatically recorded.

SUMMARY OF THE INVENTION

However, the method disclosed in Japanese Patent Application Laid-Open No. 2004-135029 has a drawback that a focus evaluation area needs to be set beforehand and, if a main subject is not in the set focus evaluation area, an image in which the main subject is in focus cannot be obtained.

Another drawback of the method disclosed in Japanese Patent Application Laid-Open No. 2004-135029 is that, because the a main subject is focused first and then the focus position is moved back and forth, there is a time lag between the moment the shutter button is pressed and the moment an image is actually taken and accordingly the right moment to shoot may be missed.

The present invention has been made in light of these circumstances and an object of the present invention is to provide an image-taking method and apparatus capable of quickly taking images in which the face of a person is in focus.

To achieve the object, an image-taking method for taking an image including a person according to a first aspect of the present invention, includes: taking a plurality of images with different focus positions; detecting a human face or eye in each of the images taken, setting an area enclosing the detected human face or eye as a focus evaluation area, and calculating a focus evaluation value in the focus evaluation area; choosing an image with the highest focus evaluation value; and recording the chosen image.

According to the first aspect of the present invention, multiple images are taken first with different focus positions. Then, a human face or, eye or eyes are detected in each of the images taken and an area enclosing the detected human face or eye(s) is set as a focus evaluation area to calculate a focus evaluation value. After focus evaluation values for all images taken have been calculated, the image with the highest focus evaluation value among the images is chosen and is recorded. Thus, an image in which the human face is in focus can be readily taken without having to perform cumbersome operations such as an image choosing operation. In addition, since shooting can be started immediately upon the issuance of an instruction to shoot, the shutter time lag can be practically eliminated and the right moment to shoot can be effectively prevented from being missed.

To achieve the object, an image-taking method for taking an image including a person according to a second aspect, includes: taking a plurality of images with different focus positions; detecting a human face or eye in a reference image being a particular image among the images taken and setting an area enclosing the detected human face or eye as a focus evaluation area; calculating a focus evaluation value in the focus evaluation area of each of the images taken; choosing an image with the highest focus evaluation value; and recording the chosen image.

According to the second aspect of the present invention, multiple images are taken first with different focus positions. Then, a particular image (for example the first image taken) among the images taken is used as a reference image and a human face or eye(s) is detected in the reference image. An area enclosing the detected human face or eye(s) is set as a focus evaluation area and focus evaluation values in the set focus evaluation area of all the images taken are calculated. After the focus evaluation values for all the images have been calculated, the image with the highest focus evaluation value is chosen and is recorded. Thus, an image in which the human face is in focus can be readily taken without having to perform cumbersome operations such as an image choosing operation. In addition, since shooting can be started immediately upon the issuance of an instruction to shoot, the shutter time lag can be practically eliminated and the right moment to shoot can be effectively prevented from being missed.

To achieve the object, an image-taking method for taking an image including a plurality of people according to a third aspect, includes: taking a plurality of images with different focus positions; calculating an evaluation value representing the likelihood of being a face or eye in each of the images taken to detect a human face or eye; calculating a weighted average of the evaluation values representing the likelihood of being a face or eye for each detected human face or eye; choosing a human face or eye with the highest weighted average of evaluation values representing the likelihood of a face or eye and setting an area enclosing the face or eye in a reference image being a particular image among the images taken, as a focus evaluation area; calculating a focus evaluation value in the focus evaluation area of each of the images taken; choosing an image with the highest focus evaluation value; and recording the chosen image.

According to the third aspect of the present invention, multiple images are taken first with different focus positions. Then, an evaluation value representing the likelihood of being a face or eye is calculated in each of the images taken to detect a human face or eye(s). A weighted average of the evaluation values representing the likelihood of being a face or eye is calculated for each human face or eye(s) detected. For example, a higher weight can be assigned to the evaluation values for the first image taken. That is, since the first image taken is more likely to have scene conditions (such as the position and direction of a face) intended by the photographer, the possibility that the face or eye of a person intended by the photographer will be chosen is increased by assigning a higher weight to the evaluation values for the first image taken. The weighted averaging here also includes averaging in which an equal weight is assigned to the evaluation values representing the likelihood of being a human face or eye obtained from the images to obtain the average (the most common type of average). After the weighted averages of the evaluation values are thus obtained, the human face or eye(s) with the highest weighted average of evaluation values representing the likelihood of being a face or eye is chosen. Then, a particular one of the images taken is selected as a reference image and an area enclosing the human face or eye(s) in the reference image is set as a focus evaluation area. That is, the person with the highest weighted average of the evaluation values representing the likelihood of a face or eyes is chosen as the main subject among multiple people included in the images and an area enclosing the face or eyes of the person is set as a focus evaluation area. A predetermined N-th image taken (for example the first image taken) is used as the reference image and a focus evaluation area enclosing the face or eyes of the person chosen as the main subject in the reference image is set. After the focus evaluation area is thus set, the focus evaluation values in the focus evaluation area of all images taken are calculated. After the focus evaluation values for all images have been calculated, the image with the highest focus evaluation value among the images is chosen and recorded. Thus, an image in which the human face is in focus can be readily taken without having to perform cumbersome operations such as an image choosing operation. In addition, when an image includes multiple people, the main subject in the image can be properly chosen and an image in which the main subject is in focus can be taken. Furthermore, since shooting can be started immediately upon the issuance of an instruction to shoot, the shutter time lag can be practically eliminated and the right moment to shoot can be effectively prevented from being missed.

To achieve the object, an image-taking method for taking an image including a plurality of people according to a fourth aspect, includes: taking a plurality of images with different focus positions; calculating an evaluation value representing the likelihood of being a face or eye in each of the images taken to detect a human face or eye; choosing a human face or eye with the highest evaluation value representing the likelihood of a face or eye in each of the images taken; choosing a human face or eye being chosen the most times as a human face or eye with a high evaluation value representing the likelihood of being a face or an eye and setting an area enclosing the human face or eye in a reference image being a particular image among the images taken, as a focus evaluation area; calculating a focus evaluation value in the focus evaluation area of each of the images taken; choosing an image with the highest evaluation value; and recording the chosen image.

According to the fourth aspect of the present invention, multiple images are taken first with different focus positions. Then, an evaluation value representing the likelihood of being a face or eyes is calculated in each of the images taken to detect a human face or eye(s). The human face or eye(s) with the highest evaluation value representing the likelihood of a face or eye is chosen from each of the images taken. Then the human face or eye(s) chosen the most times as the human face or eyes with the highest evaluation value representing the likelihood of being a face or eyes is chosen and an area enclosing that human face or eye(s) in the reference image is set as a focus evaluation area. That is, the person with the highest evaluation value representing the likelihood of being a face or eyes in each of the images including multiple people is chosen as the main subject and an area enclosing the face or eye(s) of the person is set as a focus evaluation area. A predetermined N-th image taken (for example the first image taken) is used as the reference image and a focus evaluation area enclosing the face or eyes of the person chosen as the main subject in the reference image is set. After the focus evaluation area is set, the focus evaluation values in the focus evaluation area for all images taken are calculated. After the focus evaluation values for all images have been calculated, the image with the highest focus evaluation value among the images is chosen and recorded. Thus, an image in which the human face is in focus can be readily taken without having to perform cumbersome operations such as an image choosing operation. In addition, when an image includes multiple people, the main subject in the image can be properly chosen and an image in which the main subject is in focus can be taken. Furthermore, since shooting can be started immediately upon the issuance of an instruction to shoot, the shutter time lag can be practically eliminated and the right moment to shoot can be effectively prevented from being missed.

To achieve the object, an image-taking method for taking an image including a plurality of people according to a fifth aspect, includes: taking a plurality of images with different focus positions; calculating an evaluation value representing the likelihood of being a face or eye from a reference image being a particular image among the images taken, to detect human faces or eyes; choosing a human face or eye with the highest evaluation value representing the likelihood of being a face or an eye from among the detected human faces or eyes and setting an area enclosing the human face or eye in the reference image as a focus evaluation area; calculating a focus evaluation value in the focus evaluation area of each of the images taken; choosing an image with the highest focus evaluation value; and recording the chosen image.

According to the fifth aspect of the present invention, multiple images are taken first with different focus positions. Then a particular image (for example the first image taken) among the images taken is selected as a reference image and evaluation values representing the likelihood of being a face or eye in the reference image are calculated to detect a human face or eyes. Then, the human face or eye with the highest evaluation value representing the likelihood of being a face or eye among the humane faces or eyes detected, is chosen and an area enclosing the human face or eye(s) in the reference image is set as a focus evaluation area. That is, the person with the highest evaluation value representing the likelihood of being a face or eyes in a particular image (reference image) is chosen as the main subject in images including multiple people and an area enclosing the face or eyes of the person is set as a focus evaluation area. Since the first image taken is more likely to have scene conditions (such as the position and direction of a face) intended by the photographer, the first image taken is preferably used as the reference image. After the focus evaluation area is thus set, focus evaluation values in the set focus evaluation area for all images taken are calculated. After the focus evaluation values for all images have been calculated, the image with the highest focus evaluation value among the images is chosen and recorded. Thus, an image in which the human face is in focus can be readily taken without having to perform cumbersome operations such as an image choosing operation. In addition, when an image includes multiple people, the main subject in the image can be properly chosen and an image in which the main subject is in focus can be taken. Furthermore, since shooting can be started immediately upon the issuance of an instruction to shoot, the shutter time lag can be practically eliminated and the right moment to shoot can be effectively prevented from being missed.

To achieve the object, according to a sixth aspect, the image-taking method according to any one of the seconds to fifth aspects, further includes: obtaining a motion vector for each of the images; and correcting a focus evaluation area set in each image or each whole image on the basis of the obtained motion vector.

According to the sixth aspect of the present invention, in any of the second to fifth aspect of the invention, a motion vector for each image is obtained and the focus evaluation area set in each image is corrected based on the obtained motion vector. Alternatively, the whole of each image is corrected based on the obtained motion vector. Thus, even when the position of a face is displaced because of a movement of the subject or a shake of the image-taking apparatus, focus evaluation of the face or eyes of the same person can be accurately made.

To achieve the object, according to a seventh aspect, in the image-taking method according to the sixth aspect, the motion vector is obtained by using feature point tracking.

According to the seventh aspect of the invention, motion vectors are detected by the feature point tracking.

To achieve the object, according to an eighth aspect, in the image-taking method according to the sixth aspect, the motion vector is calculated on the basis of an output from a detecting device which detects a shake of an image-taking apparatus.

According to the eighth aspect of the invention, motion vectors are detected on the basis of outputs from the detecting device which detects a shake of the image-taking apparatus.

To achieve the object, according to a ninth aspect, the image-taking method according to any one of the first to eighth aspects, further includes: before recording a chosen image, displaying the chosen image on a display device; allowing a user to choose whether or not to record the image being displayed on the display device; and recording the image being displayed on the display device only when the user chooses to record the image.

According to the ninth aspect of the present invention, before the image with the highest focus evaluation value chosen as the optimum image is displayed on the display device before the image is recorded. The user is asked whether the user wants to record the image or not and, only if the user selects recording, the image is recorded. This can avoid recording an unnecessary image.

To achieve the object, according to a tenth aspect, the image-taking method according to the ninth aspect, further includes: when the user chooses not to record the image, choosing an image with the second highest focus evaluation value from among the plurality of images taken; displaying the chosen image on the display device; allowing the user to choose whether or not to record the image being displayed on the display device; and recording the image being displayed on the display device only when the user chooses to record the image.

According to the tenth aspect of the invention, if the user selects not to record in the ninth aspect of the invention, the image with the next highest focus evaluation value is chosen from among the images taken and is displayed on the display device. Then, the user is asked whether the image should be recorded or not and, only if the user selects recording, the image is recorded. Thus, a desired image can be readily selected and recorded.

To achieve the object, according to an eleventh aspect, an image-taking apparatus which takes an image by using an imaging device in response to an image-taking instruction and records the taken image in a storage medium, the image-taking apparatus includes: an imaging control device which causes the imaging device to take a plurality of images with different focus positions in response to a single image-taking instruction; a face or eye detecting device which detects a human face or eye in each of the images taken in response to the single image-taking instruction; a focus evaluation area setting device which sets an area enclosing a human face or eye detected by the face or eye detecting device as a focus evaluation area in each of the images taken in response to the single image-taking instruction; a focus evaluation value calculating device which calculates a focus evaluation value in the focus evaluation area set by the focus evaluation area setting device in each of the images taken in response to the single image-taking instruction; an image choosing device which chooses an image with the highest focus evaluation value from among the plurality of images taken in response to the single image-taking instruction; and a recording control device which records the image chosen by the image choosing device in the storage medium.

According to the eleventh aspect of the invention, as in the first aspect of the present invention, an image in which a human face is in focus can be readily taken without having to perform cumbersome operations such as an image choosing operation. Furthermore, since shooting can be started immediately upon the issuance of an instruction to shoot, the shutter time lag can be practically eliminated and the right moment to shoot can be effectively prevented from being missed.

To achieve the object, according to a twelfth aspect, an image-taking apparatus which takes an image with an imaging device in response to an image-taking instruction and records the taken image in a storage medium, the image-taking apparatus includes: an imaging control device which causes the imaging device to take a plurality of images with different focus positions in response to a single image-taking instruction; a face or eye detecting device which detects a human face or eye in a reference image being a particular image among the taken images; a focus evaluation area setting device which sets an area enclosing the human face or eye detected by the face or eye detecting device in the reference image as a focus evaluation area; a focus evaluation value calculating device which calculates a focus evaluation value in the focus evaluation area set by the focus evaluation area setting device in each of the images taken in response to the single image-taking instruction; an image choosing device which chooses an image with the highest focus evaluation value from among the plurality of images taken in response to the single image-taking instruction; and a recording control device which records the image chosen by the image choosing device in the storage medium.

According to the twelfth aspect of the present invention, as in the second aspect of the invention, an image in which a human face is in focus can be readily taken without having to perform cumbersome operations such as an image choosing operation. Furthermore, since shooting can be started immediately upon the issuance of an instruction to shoot, the shutter time lag can be practically eliminated and the right moment to shoot can be effectively prevented from being missed.

To achieve the object, according to a thirteenth aspect, an image-taking apparatus which takes an image with an imaging device in response to an image-taking instruction and records the taken image in a storage medium, the image-taking apparatus includes: an imaging control device which causes the imaging device to take a plurality of images with different focus positions in response to a single image-taking instruction; a face or eye detecting device which calculates an evaluation value representing the likelihood of being a face or eye to detect a human face or eye in each of the images taken in response to the single image-taking instruction; a focus evaluation area setting device which calculates a weighted average of the evaluation values representing the likelihood of being a face or eye for each human face or eye detected by the face or eye detecting device, chooses a human face or eye with the highest weighted average of the evaluation values representing the likelihood of being a face or eye, sets an area enclosing the human face or eye in a reference image being a particular image among the images taken, as a focus evaluation area; a focus evaluation value calculating device which calculates a focus evaluation value in the focus evaluation area set by the focus evaluation area setting device in each of the images taken in response to the single image-taking instruction; an image choosing device which chooses an image with the highest focus evaluation value from among the plurality of images taken in response to the single image-taking instruction; and a recording control device which records the image chosen by the image choosing device in the storage media.

According to the thirteenth aspect of the present invention, as in the third aspect of the present invention, an image in which a human face is in focus can be readily taken without having to perform cumbersome operations such as an image choosing operation. In addition, when an image includes multiple people, the main subject in the image can be properly chosen and an image in which the main subject is in focus can be taken. Furthermore, since shooting can be started immediately upon the issuance of an instruction to shoot, the shutter time lag can be practically eliminated and the right moment to shoot can be effectively prevented from being missed.

To achieve the object, according to a fourteenth aspect, an image-taking apparatus which takes an image with an imaging device in response to an image-taking instruction and records the taken image in a storage medium, the image-taking apparatus includes: an imaging control device which causes the imaging device to take a plurality of images with different focus positions in response to a single image-taking instruction; a face or eye detecting device which calculates an evaluation value representing the likelihood of being a face or eye to detect a human face or eye in each of the images taken in response to the single image-taking instruction; a focus evaluation area setting device which chooses human faces or eyes with the highest evaluation value representing the likelihood of being a face or eye from among human faces or eyes detected by the face or eye detecting device, chooses a human face or eye being chosen the most times, and sets an area enclosing the human face or eye in a reference image being a particular image among the images taken, as a focus evaluation area; a focus evaluation value calculating device which calculates a focus evaluation value in the focus evaluation area set by the focus evaluation area setting device in each of the images taken in response to the single image-taking instruction; an image choosing device which chooses an image with the highest focus evaluation value from among the plurality of images taken in response to the single image-taking instruction; and a recording control device which records the image chosen by the image choosing device in the storage medium.

According to the fourteenth aspect of the present invention, as in the fourth aspect of the invention, an image in which the human face is in focus can be readily taken without having to perform cumbersome operations such as an image choosing operation. In addition, when an image includes multiple people, the main subject in the image can be properly chosen and an image in which the main subject is in focus can be taken. Furthermore, since shooting can be started immediately upon the issuance of an instruction to shoot, the shutter time lag can be practically eliminated and the right moment to shoot can be effectively prevented from being missed.

To achieve the object, according to a fifteenth aspect, an image-taking apparatus which takes an image with an imaging device in response to an image-taking instruction and records the taken image in a storage medium, the image-taking apparatus includes: an imaging control device which causes the imaging device to take a plurality of images with a different focus positions in response to a single image-taking instruction; a face or eye detecting device which calculates an evaluation value representing the likelihood of being a face or eye from a reference image being a particular image among the images taken, to detect a human face or eye; a focus evaluation area setting device which chooses a human face or eye with the highest evaluation value representing the likelihood of being a face or eye among human faces or eyes detected by the human face or eye detecting device and sets an area enclosing the human face or eye in the reference image as a focus evaluation area; a focus area evaluation value calculating device which calculates a focus evaluation value in the focus evaluation area set by the focus evaluation area setting device in each of the images taken in response to the single image-taking instruction; an image choosing device which chooses an image with the highest focus evaluation value from among the plurality of images taken in response to the single image-taking instruction; and a recording control device which records the image chosen by the image choosing device in the storage medium.

According to the fifteenth aspect of the present invention, as in the fifth aspect of the invention, an image in which the human face is in focus can be readily taken without having to perform cumbersome operations such as an image choosing operation. In addition, when an image includes multiple people, the main subject in the image can be properly chosen and an image in which the main subject is in focus can be taken. Furthermore, since shooting can be started immediately upon the issuance of an instruction to shoot, the shutter time lag can be practically eliminated and the right moment to shoot can be effectively prevented from being missed.

To achieve the object, according to a sixteenth aspect, the image-taking apparatus according to any one of the twelfth to fifteenth aspects, further includes: a motion vector detecting device which detects an motion vector for each image; and a correcting device which corrects a focus evaluation area set in each image or each whole image on the basis of the motion vector detected by the motion vector detecting device.

According to the sixteenth aspect of the present invention, as in the sixth aspect of the invention, when the position of a face is displaced because of a movement of the subject or a shake of the image-taking apparatus, focus evaluation of the face or eyes of the same person can be accurately made.

To achieve the object, according to a seventeenth aspect, in the image-taking apparatus according to the sixteenth aspect, the motion vector detecting device detects a motion vector for each image by feature point tracking.

According to the seventeenth aspect of the present invention, as in the seventh aspect, the motion vectors are detected by using feature point tracking.

To achieve the object, according to an eighteenth aspect, in the image-taking apparatus according to the sixteenth aspect, the motion vector detecting device comprises a shake detecting device which detects a shake of the image-taking apparatus and calculates the motion vector for each image on the basis of an output from the shake detecting device.

According to the eighteenth aspect of the present invention, as in the eighth aspect of the invention, motion vectors are detected on the basis of outputs from the detecting device which detects shakes of the image-taking apparatus.

To achieve the object, according to a nineteenth aspect, the image-taking apparatus according to any one of the eleventh to eighteenth aspects, further includes: a display device which displays an image; a display control device which causes the display device to display an image chosen by the image choosing device; and an instruction device which instructs whether or not to record the image being displayed on the display device, wherein the recording control device records the image being displayed on the display device in the storage medium only when the image-taking apparatus is instructed to record the image by the instruction device.

According to the nineteenth aspect of the present invention, as in the ninth aspect of the invention, recording of an unnecessary image can be avoided.

To achieve the object, according to a twentieth aspect, in the image-taking apparatus according to the nineteenth aspect, when the image-taking apparatus is instructed not to record the image by the instruction device, the image choosing device chooses an image with the second highest focus evaluation value from among the plurality of images taken in response to the single image-taking instruction; the display control device causes the display device to display the image chosen by the image choosing device; and the recording control device records the image being displayed on the display device in the storage medium only when the image-taking apparatus is instructed to record the image by the instruction device.

According to the twentieth aspect of the present invention, as in the tenth aspect, an appropriate image can be readily selected and recorded.

According to the present invention, an image in which a human face is in focus can be quickly taken.

BRIEF DESCRIPTION OF THE DRAWINGS

FIGS. 5A and 5B are diagrams for illustrating a method for correcting a focus area;

FIG. 8 is a block diagram showing an example of a digital camera including the function of correcting a focus area;

FIG. 11 is a diagram for illustrating setting of a focus area for an image including more than one person by using a first method;

FIG. 12 is a diagram for illustrating setting of a focus area for an image including more than one person by using a second method;

DETAILED DESCRIPTION OF THE PREFERRED EMBODIMENTS

Preferred embodiments of an image-taking method and apparatus according to the present invention will be described with reference to the accompanying drawings.

Figure 1:
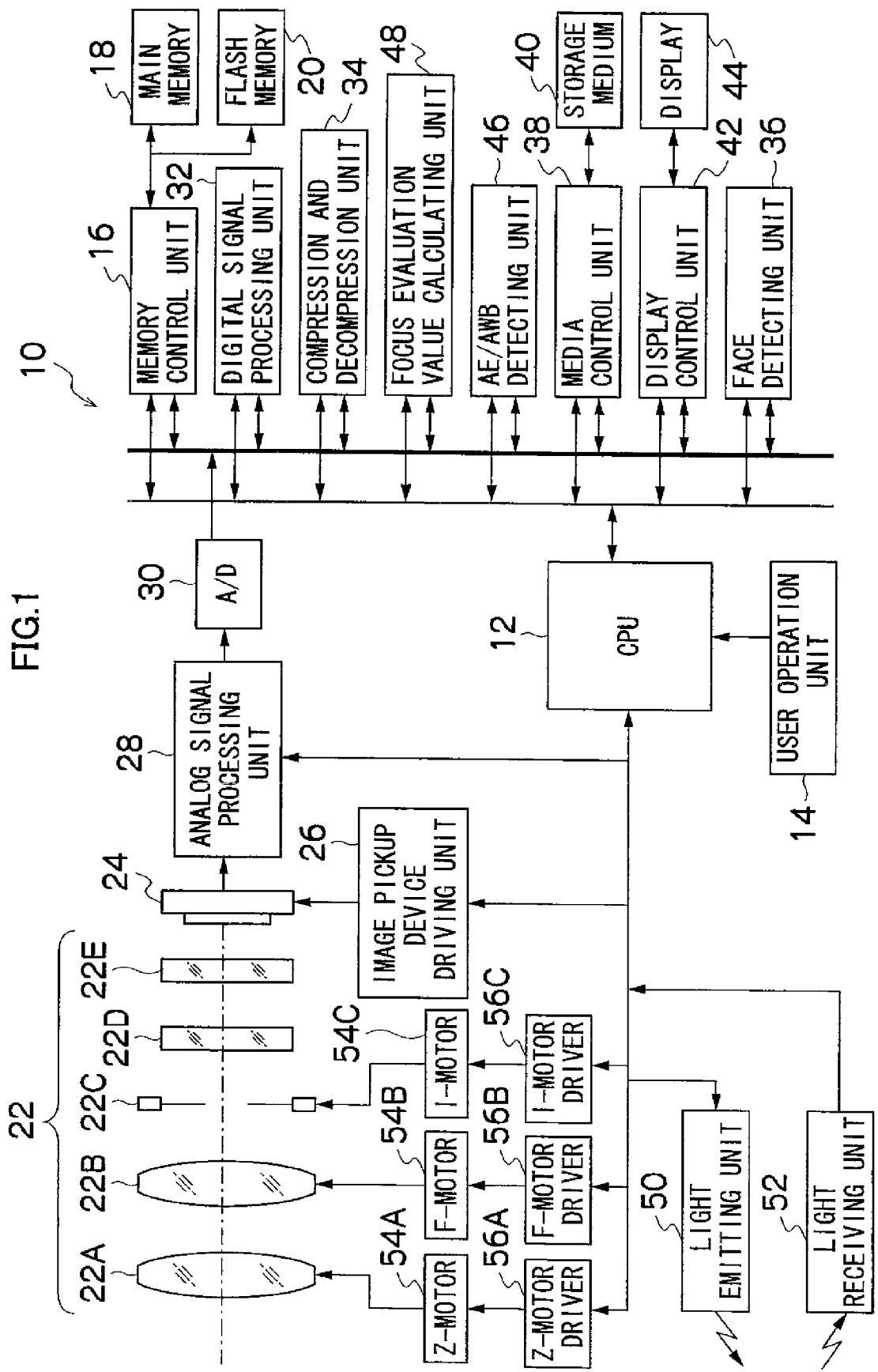
FIG. 1 is a block diagram showing a configuration of one embodiment of a digital camera to which the present invention is applied.

FIG. 1 is a block diagram showing a configuration of one embodiment of a digital camera to which the present invention is applied.

As shown, the digital camera 10 according to the present embodiment includes a CPU 12, a user operation unit 14, a memory control unit 16, a main memory 18, a flash memory 20, an imaging optical system 22, an image pickup device 24, an image pickup device driving unit 26, an analog signal processing unit 28, an A/D converter 30, a digital signal processing unit 32, a compression and decompression unit 34, a face detecting unit 36, a media control unit 38, a storage medium 40, a display control unit 42, a display 44, an AE/AWB detecting unit 46, a focus evaluation value calculating unit 48, a light emitting unit 50, and a light receiving unit 52, and other components.

The CPU 12 functions as a controller centrally controlling operation of the entire digital camera 10 as well as a processor performing various kinds of computation processing. The CPU 12 controls the components of the digital camera 10 in accordance with a given control program on the basis of an input from the user operation unit 14.

The memory control unit 16 reads and writes data on the main memory 18 and the flash memory 20 in response to an instruction from the CPU 12. The flash memory 20 stores a control program to be executed by the CPU 12 and various kinds of data required for control. The CPU 12 loads the control program stored in the flash memory 20 into the main memory 18 and executes the control program while using the main memory 18 as a work area to control the operation of the camera.

The main memory 18 is used as a temporary storage area for image data as well as the work area for the CPU 12. In addition to the control program to be executed by the CPU 12, information such as user-setting information is stored in the flash memory 20.

The user operation unit 14 includes a power button for powering on and off the digital camera 10, a shutter button for inputting an instruction to take an image, a mode selection switch for switching between shooting and playback modes, a zoom button for inputting an instruction to select tele-zoom or wide zoom, a menu button for inputting an instruction to display a menu for setting various settings, an OK button for inputting an instruction to execute an operation, a cancel button for inputting an instruction to cancel an operation, and a four-way arrow pad for inputting a movement in the up, down, left, and right directions, and other control buttons. The user operation unit 14 outputs a signal corresponding to an operation on each control button to the CPU 12.

Settings of the digital camera 10 are made by using menus displayed on the display 44 in response to depression of the menu button. For example, menus are used in shooting to set an exposure mode (such as automatic exposure, manual exposure, shutter-priority exposure, aperture-priority exposure, program exposure, and scene program exposure modes (such as portrait, night scene, sports, landscape, and underwater modes)), a white balance mode (such as an automatic, daylight, overcast, fluorescent lamp, tungsten lamp, and manual modes), sensitivity and image quality (such as a image size, compression ratio, and sharpness), a self-timer, and a focus bracketing mode. Menus are also used in playback for deleting a played-back image, formatting a storage medium, and setting Digital Print Order Format. The basic setup of the camera such as date/time and language settings is also made by using a menu.

The imaging optical system 22 constituting an imaging lens is formed by AF zoom lenses including a zoom lens 22A, a focus lens 22B, an aperture 22C, an infrared cut filter 22D, and an optical low-pass filter 22E.

The zoom lens 22A is driven by a zoom motor 54A to move forward and backward along the optical axis to change the focal length of the imaging lens. The CPU 12 controls the driving of the zoom motor 54A through a zoom driver 56A to control the focal length of the imaging lens.

The focus lens 22B is driven by a focus motor 54B to move forward and backward along the optical axis to change the focus position of the imaging lens. The CPU 12 controls the driving of the focus motor 54B through a focus motor driver 56B to control the focus position of the imaging lens.

The aperture 22C is implemented by an iris aperture, which is driven by an iris motor 54C to change its aperture ratio (f number). The CPU 12 controls the driving of the iris motor 54C through the iris motor driver 56C to control the aperture ratio (f number) of the aperture 22C. While the iris aperture is used in the example, other aperture such as a turret aperture may be used.

The image pickup device 24 is formed by a color CCD having a predetermined color filter arrangement and picks up an optical image of a subject formed by the imaging optical system 22. A large number of photodiodes are arranged on the light receiving surface of the image pickup device 24. Each of the photodiodes converts incident light that hits the light receiving surface of the image pickup device 24 to a signal charge equivalent to the amount of incident light and stores the signal charge. The signal charge stored in each photodiode is read out in synchronization with a driving pulse provided from an image pickup device driving unit 26 and is output as a voltage signal (analog image signal) corresponding to the stored signal charge. The CPU 12 controls the image pickup driving unit 26 to control the driving of the image pickup device 24.

While a CCD is used as the image pickup device in the present embodiment, an image pickup device of other type such as a CMOS may be used.

The analog signal processing unit 28 performs correlated double sampling (processing in which the difference between the level of a feed-through component contained in an output signal of each pixel of the image pickup device and the level of a pixel signal component is calculated to obtain accurate pixel data with the aim of reducing noise (especially thermal noise)) on an image signal output from the image pickup device 24 and outputs an amplified image signal.

The A/D converter 30 converts R, G, and B analog image signals output from the analog signal processing unit 28 to digital image signals and outputs the digital image signals. Image signals in one frame output from the A/D converter 30 are stored in the main memory 18 through the memory control unit 16.

The digital signal processing unit 32 takes in an image signal stored in the main memory 18 and applies various kinds of signal processing to the image signal to generate image data (YC data) including luminance data (Y data) and chrominance data (Cr data, Cb data) in accordance with an instruction from the CPU 12. The digital signal processing unit 32 also applies various kinds of image processing to the image data, such as resizing, gradation correction, color tone correction, and brightness correction in accordance with an instruction from the CPU 12.

The compression and decompression unit 34 applies compression to input image data according to a predetermined compression format (for example JPEG) in accordance with an instruction from the CPU 12 to generate compressed image data. The compression and decompression unit 34 also applies predetermined decompression to input image data to generate decompressed image data in accordance with an instruction from the CPU 12.

The face detecting unit 36 detects a human face included in an image from image data in accordance with an instruction from the CPU 12. The face area detection process is performed by using a method in which information on shades of an average human face is held beforehand and the difference between the shade information and information on shades of a particular area of the image is calculated as a face evaluation value, and the particular area is moved around the image and the face evaluation value in each area is calculated, then the location with the highest face evaluation value (that is, the location with the smallest difference from the shade information of the average human face) is determined as a location where a human face exist.

Other methods for extracting a human face from an image are known, including: a method in which skin tone data is extracted from an original image and a cluster of metering points determined to be a skin tone area is extracted as a face area; a method in which metering data is converted to a hue and chroma and a two-dimensional histogram of the hue and chroma is generated and analyzed to determine a face area; a method in which a candidate face area analogous to the shape of a human face is extracted and a face area is determined from feature quantities in the area; a method in which the outline of a human face is extracted from an image to determine a face area; and a method in which multiple templates having face shapes are provided, the correlation between each of the templates and an image is calculated, and the a candidate face area is determined on the basis of the correlation values to extract a human face. Any of these methods may be used to extract a human face area.

The media control unit 38 reads and writes data on a storage medium 40 in accordance with an instruction from the CPU 12. The storage medium 40 may be a memory card, for example, and removably loaded in a media slot, not shown.

The display control unit 42 controls display on the display 44 in accordance with an instruction from the CPU 12. In particular, the display control unit 42 converts an input image signal into a video signal for displaying on the display 44 in accordance with an instruction from the CPU 12 and outputs the video signal to the display 44. The display control unit 42 also outputs, given information such as characters, graphics, and symbols to the display 44 in accordance with an instruction from the CPU 12. The display 44 may be implemented by a color liquid-crystal display, for example.

The AE/AWB detecting unit 46 calculates integrated values of image signals required for AE control and AWB control from the image signals in accordance with an instruction from the CPU 12. For example, one screen is divided into areas (for example 16 times 16 areas) and an integrated value of each of R, G, and B image signals in each area is calculated.

The CPU 12 detects the brightness of a shot scene on the basis of integrated values obtained from the AE/AWB detecting unit 46 and calculates an exposure value (EV) suitable for the shooting. Then, the CPU 12 determines an exposure (f number, shutter speed) from the calculated EV and a given program chart.

The CPU 12 calculates the ratio between R and G and the ratio between B and G in each of the areas into which the screen is divided from the calculated R integrated value, B integrated value, and G integrated value and determines the type of the light source. The CPU 12 then determines a white balance correction value such that the value of each ratio becomes approximately 1 (that is, the ratio of R, G, and B integrated values in one screen is R:G:B≈1:1:1) in accordance with a white balance adjustment value suitable for the determined light source type.

The focus evaluation value calculating unit 48 calculates a focus evaluation value in a given focus area (focus evaluation area) from an image signal in accordance with an instruction form the CPU 12.

The focus evaluation value calculating unit 48 includes a high-pass filter which passes only a high-frequency component of an input image signal, an absolute value generating unit, a focus area extracting unit which extracts signals in a given focus area, an integrating unit which integrates absolute value data in the focus area, and other components and outputs the value integrated by the integrating unit to the CPU 12 as a focus evaluation value.

In an autofocus mode, the CPU 12 causes the focus evaluation value calculating unit 48 to calculate focus evaluation values at predetermined intervals while moving the focus lens 22B from a close distance toward the infinity distance, and obtains the results of the calculations. Then, the CPU 12 detects the position in which the peak focus evaluation value is obtained as an in-focus position and moves the focus lens 22B to the position.

In a focus bracketing mode, which will be described later, the CPU 12 causes the focus evaluation value calculating unit 48 to calculate a focus evaluation value from images continuously taken with different focus positions, and obtains the results of the calculation. The CPU 12 then chooses and records an image with the highest focus evaluation value as an in-focus image.

The CPU 12 sets a focus area (focus evaluation area) in which the focus evaluation value calculating unit 48 calculates a focus evaluation value from an image.

The configuration of the focus evaluation value calculating unit 48 is not limited to this. Any configuration capable of calculating a focus evaluation value for a set focus area may be used.

The light emitting unit 50 includes a flash, and a light emission control unit and causes the flash to emit flash light in accordance with an instruction from the CPU 12.

The light receiving unit 52 receives flash light emitted from the light emitting unit 50 and reflected from a subject and outputs an electric signal corresponding to the amount of light it received to the CPU 12. When the integrated amount of light received at the light receiving unit 52 reaches a predetermined proper amount of received light, the CPU 12 causes the light emitting unit 50 to stop emitting light (so-called dimmer control).

An operation of the digital camera 10 of the present embodiment configured as described above will be described next.

A basic shooting and recording operation will be described first.

Shooting is enabled by setting the camera in a shooting mode. Shooting and recording is performed in response to depression of the shutter button.

When the camera is placed in the shooting mode, driving of the image pickup device 24 is started and an image captured by the image pickup device 24 is displayed on the display 44 as a through-display. That is, image signals are continuously taken in from the image pickup device 24 and the image signals are sequentially processed, output and displayed on the display 44.

In doing this, detection of a human face is performed concurrently. When a human face is detected, a detection box enclosing the face is superimposed on the image through-displayed on the display 44.

The face detection is performed as follows. The image data (Y/C data) generated at the digital signal processing unit 32 is provided to the face detecting unit 36 and a human face area is detected in the image. The information on the detected face is provided to the CPU 12. The CPU 12 displays a face detection box on the display 44 on the basis of the face area information.

The photographer looks at the image through-displayed on the display 44 (through-image) and determines the composition of the picture and presses the shutter button halfway down.

Upon the halfway depression of the shutter button, a signal S1ON is input in the CPU 12. In response to the signal S1ON, the CPU 12 performs processes for preparing for shooting, namely, auto exposure (AE), auto focusing (AF), and auto white balancing (AWB) processes.

First, the CPU 12 provides the image signal output from the image pickup device 24 to the main memory 18 through the analog signal processing unit 28 and the A/D converter 30 and then provides the signal to the AE/AWB detecting unit 46 and the focus evaluation value calculating unit 48.

The AE/AWB detecting unit 46 calculates integrated values required for AE control and AWB control from the input image signal and outputs the integrated values to the CPU 12. The CPU 12 determines an exposure (sensitivity, an f number, and shutter speed) and a white balance correction value on the basis of the outputs from the AE/AWB detecting unit 46.

The focus evaluation value calculating unit 48 calculates a focus evaluation value in a given focus area from the input image signal and outputs the focus evaluation value to the CPU 12. The CPU 12 controls the movement of the focus lens 22B to bring the main subject into focus on the basis of the output from the focus evaluation value calculating unit 48.

The CPU 12 sets the focus area on the basis of the result of the detection by the face detecting unit 36. That is, when a human face is detected by the face detecting unit 36, the CPU 12 sets the focus area at the detected human face and performs AF control so that the human face is brought into focus (if a human face is not detected, the CPU 12 sets the focus area at the center of the screen or a position set by the user beforehand and then performs AF control).

The user checks the through-image displayed on the display 44 to see whether the image is in focus and instructs the camera 10 to perform actual shooting, that is, fully presses the shutter button.

When the shutter button is fully pressed, a signal S2ON is input in the CPU 12. In response to the signal S2ON, the CPU 12 performs an actual shooting process, that is, a process for taking and recording an image to be recorded.

First, the image pickup device 24 is exposed to light with the exposure values (f number and shutter speed) obtained through the AE process to take the image to be recorded.

A recording image signal output from the image pickup device 24 is placed in the main memory 18 through the analog signal processing unit 28 and the A/D converter 30. The image signal placed in the main memory 18 is provide to the digital signal processing unit 32, where predetermined signal processing is applied to the image signal to convert the image signal to image data consisting of luminance data and chrominance data.

The image data generated by the digital signal processing unit 32 is temporarily stored in the main memory 18 and then is provided to the compression and decompression unit 34, where predetermined compression is applied to the image data and the compressed data is stored again in the main memory 18.

The CPU 12 adds given shooting information (such as shooting date and time and shooting conditions (such as sensitivity, f number, and shutter speed) to the compressed image data to generate a still image file in a predetermined format (for example Exif) and records the generated image file in a storage medium 40.

The image data thus stored in the storage medium 40 is displayed on the display 44 when the digital camera 10 is placed in the playback mode.

When the camera 10 is placed in the playback mode, the compressed image data in the last image file stored in the storage medium 40 is read out.

The compressed image data read out from the storage medium 40 is provided to the compression and decompression unit 34, where the compressed image data is decompressed, and then the decompressed image is output to the display 44 through the display control unit 42. With this, the image recorded on the storage medium 40 is played back on the display 44.

To play back images one by one, the left or right key on the four-way key pad is pressed. When the right key is pressed, the next image file is read out from the storage medium 40 and played back on the display 44; when the left key is pressed, the previous image file is read out from the storage medium 40 and played back on the display 44.

A process procedure of shooting and recording in the focus bracketing mode, which is one feature of the present invention, will be described below.

First Embodiment

In the focus bracketing mode, multiple images are taken with different focus positions in response to a single image-taking instruction. Then, a human face is detected in each of the images taken, a focus area is set at the position of the detected human face, and the focus evaluation value for the image is calculated. The image with the highest focus evaluation value is chosen and recorded in the storage medium 40.

Switching to the focus bracketing mode is made on a menu.

Figure 2:
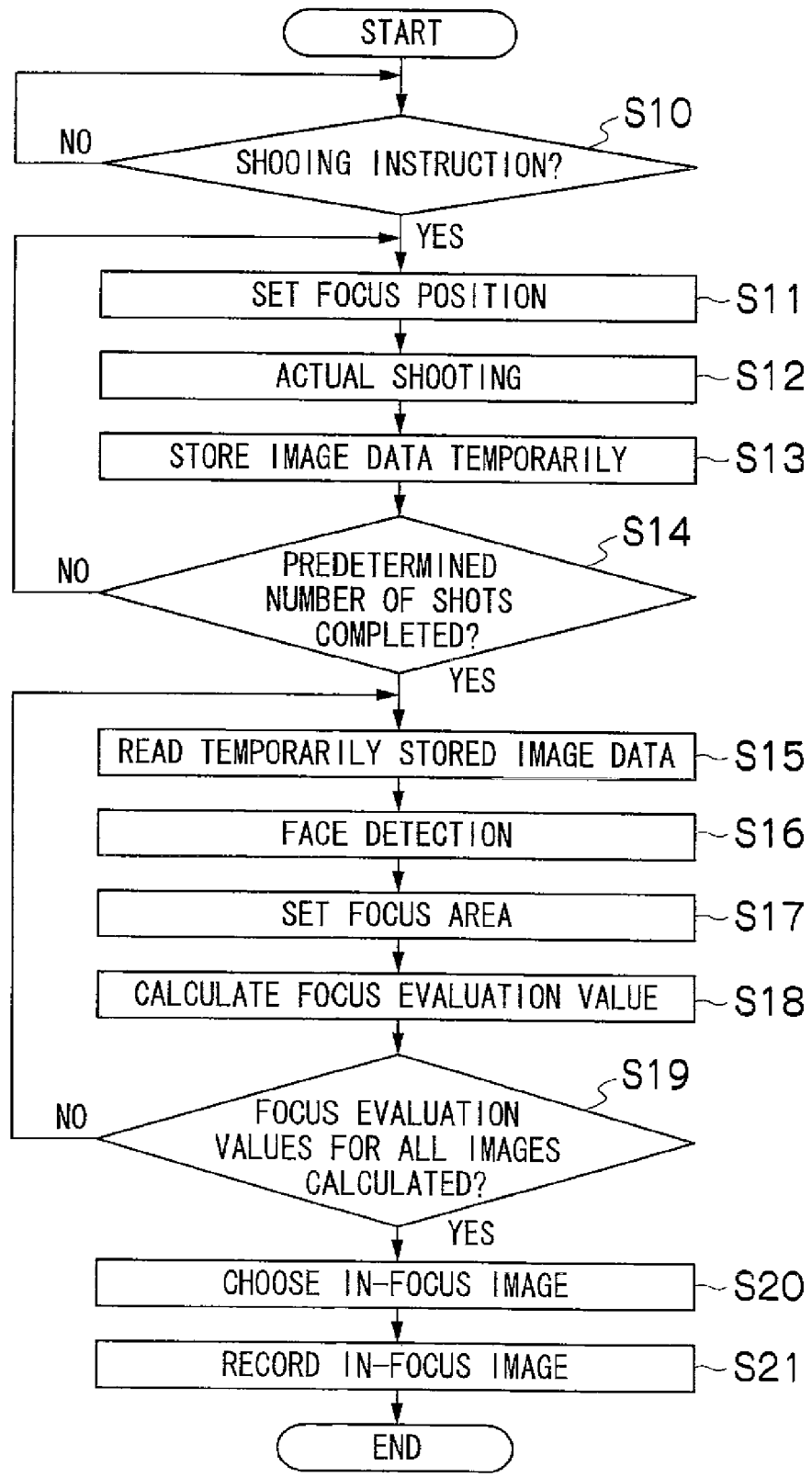
FIG. 2 is a flowchart showing a process procedure for shooting and recording in a focus bracketing mode.

FIG. 2 is a flowchart showing a process procedure for shooting and recording in the focus bracketing mode.

When the camera is placed in the focus bracketing mode, the CPU 12 determines on the basis of an input from the user operation unit 14 whether an instruction to actually take an image has been input (whether the shutter button has been fully depressed) (step S10).

When the instruction is input, the CPU 12 performs a process for taking a predetermined number of images while changing the focus position. The process is accomplished by repeating a predetermined number of times a sequence of the processing steps of setting a focus position (step S11), actually shooting (step S12), and temporarily storing image data obtained by the shooting (step S13).

In the process, the focus position is changed by a given amount and set and image data obtained through the shooting are sequentially stored in the main memory 18.

Every time image data is stored, the CPU 12 determines whether a predetermined number of shots have been completed (step S14). If the CPU 12 determines that the predetermined number of shots have been completed, the CPU 12 proceeds to the next step.

Once the predetermined number of shots with different focal points have been completed, the CPU 12 detects a face in each image obtained by the shots, sets a focus area at the detected face, and then performs a process for calculating focus evaluation values.

The process is accomplished by performing a sequence of the processing steps of reading image data (step S15), detecting a face (step S16), setting a focus area (step S17), and calculating a focus evaluation value (step S18) on all the image data temporarily stored in the main memory 18.

First, the CPU 12 reads out the image data temporarily stored in the main memory 18 (step S15) and provides the read image data to the face detecting unit 36.

The face detecting unit 36 performs a process for detecting a face in the input image data and provides the result to the CPU 12 (step S16).

Figure 3:
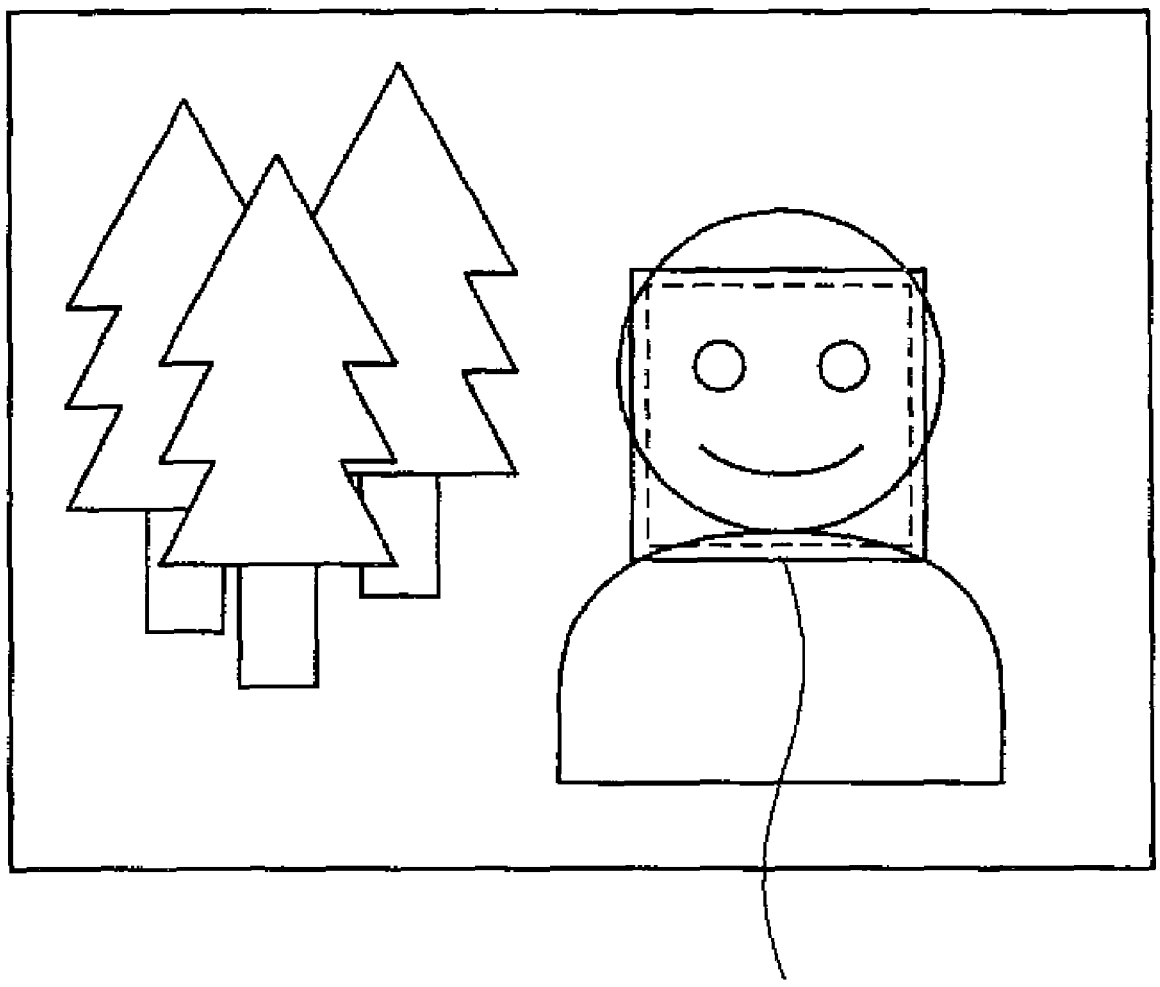
FIG. 3 is a diagram showing an exemplary setting of a focus area.

The CPU 12 sets a focus area enclosing the detected face as shown in FIG. 3 (step S17).

The CPU 12 then provides the image data to the focus evaluation value calculating unit 48 and causes the focus evaluation value calculating unit 48 to calculate the focus evaluation value for the set focus area (step S18). The calculated focus evaluation value is output to the CPU 12, which in turn stores the calculated focus evaluation value in the main memory 18 in association with the image data.

Every time the calculation of a focus evaluation value is completed, the CPU 12 determines whether the focus evaluation values for all image data have been calculated (step S19). When the CPU 12 determines that the focus evaluation values for all shot image data have been calculated, the CPU 12 proceeds to the next step.

Once the focus evaluation values of all shot image data have been calculated, the CPU 12 chooses the image with the highest focus evaluation value among the shot images as an in-focus image (step S20) and records the chosen in-focus image in the storage medium 40 (step S21).

With this, the process for shooting and recording in the focus bracketing mode will end.

In this way, multiple images are taken with different focus positions in response to a single image-taking instruction in the focus bracketing mode. A human face is detected in each of the images taken, a focus area is set at the position of the detected face, and a focus evaluation value for the image is calculated. The image with the highest focus evaluation value calculated is chosen and recorded in the storage medium 40. Thus, an image in which a human face is in focus can be readily taken without having to perform cumbersome operations such as an image choosing operation.

While nothing particular is specified for the initial focus position in the embodiment described above, the initial focus position is set for example at the position where the focus lens 22B is located when the shutter button is fully pressed.

Furthermore, when the camera is placed in the focus bracketing mode, continuous auto-focusing may be automatically started and a main subject may be automatically continuously focused until an instruction to perform actual shooting is issued. In this case, preferably human face detection is performed and a human face detected is kept in focus. The focusing may be so-called rough search (rough focusing).

Rough search may be started in response to a halfway depression of the shutter button.

The initial focus position may be set at a specified position. For example, the initial focus position may be set at a position where a subject a predetermined distance apart from the camera is in focus. By bearing the distance in mind, the photographer can readily take an image in which a human face is in focus without having to perform rough focusing beforehand. In addition, shooting can be started immediately upon issuance of an image-taking instruction without requiring AF search time before shooting. Therefore, the right moment of shooting can be effectively prevented from being missed.

In this case, preferably the user is allowed to arbitrarily set the initial focus position.

Also in this case, preferably auto-focusing by a halfway depression of the shutter button is disabled.

While the amount of change (the amount of displacement) of the focus position is not limited to a specific value, preferably the amount is set to an appropriate value by taking into consideration parameters such as the depth of field.

The direction in which the focus position is changed is also not limited. For example, the focus position may be moved toward the close distance side or the infinity side. Also, the focus position may be moved backward and forward from the initial focus position.

The number of images (shots) to be taken with a single depression of the shutter button also is not limited. Preferably, an appropriate number (for example 10) of images are set in accordance with the capacity of the main memory 18 or throughput. The number may be user-configurable.

Second Embodiment

In the first embodiment, a focus area is set for each individual image taken and the focus evaluation value for the image is calculated.

In a second embodiment, face detection is performed on the basis of a particular image, a focus area is set at the position of a face detected in the image, and the focus area is used for calculating the focus evaluation values for all images. This can reduce the overall processing time.

The image on which to base is preferably the first image taken because the first image taken in general is more likely to have scene conditions (such as the position and direction of a human face) intended by the photographer.

Figure 4:
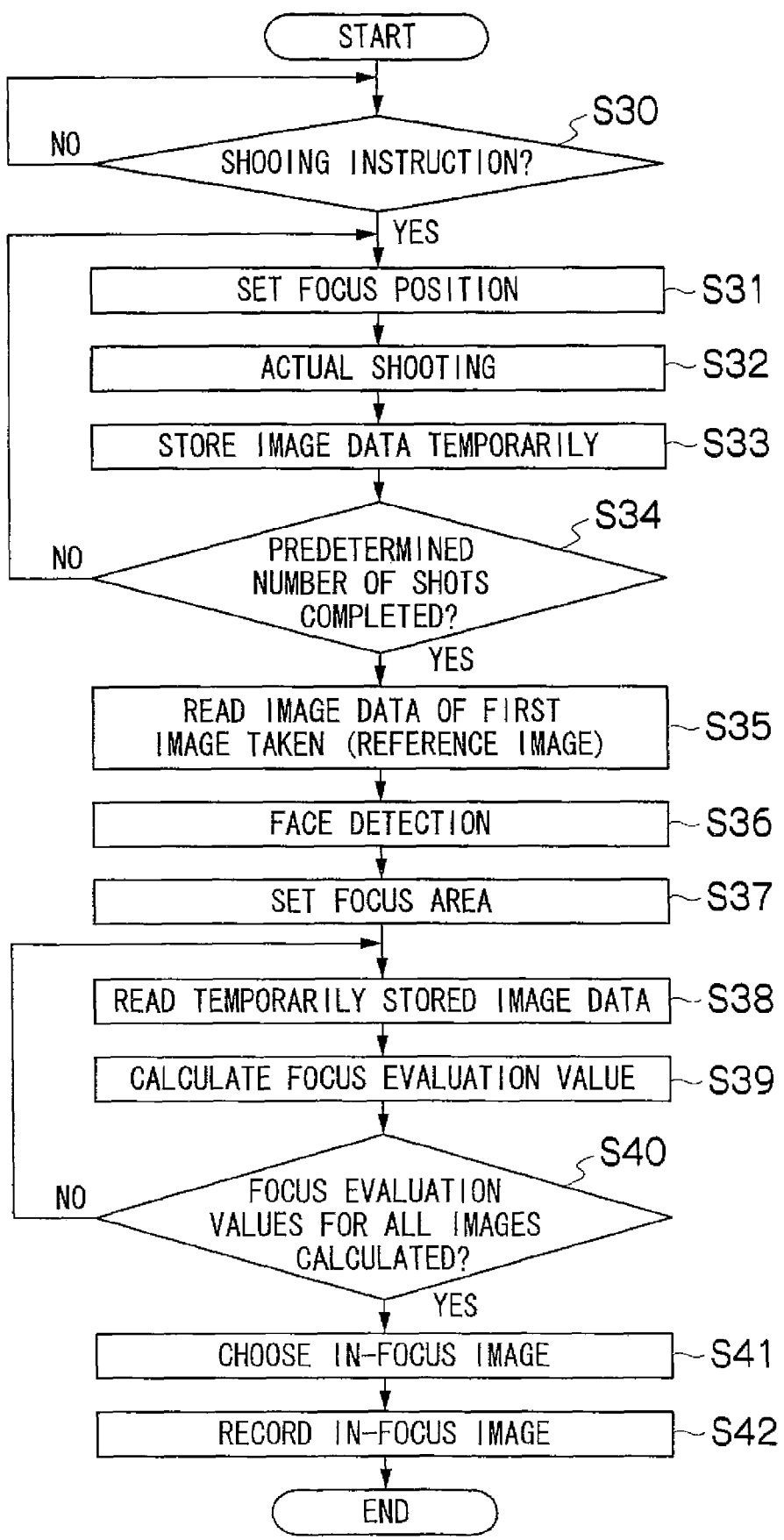
FIG. 4 is a flowchart showing a process procedure for setting a focus area at a face detected in the first image taken and calculating focus evaluation values.

FIG. 4 is a flowchart showing a process procedure for setting a focus area at a face detected in the first image taken and calculating focus evaluation values.

When the camera is placed in the focus bracketing mode, the CPU 12 determines on the basis of an input from the user operation unit 14 whether an instruction to perform actual shooting has been input (step S30).

When the instruction is input, the CPU 12 performs a process for taking a predetermined number of images with different focus positions (steps S31 through S34). The process is the same as the process from step S11 through step S14 of the first embodiment.

Once the predetermined number of images have been taken with different focus positions, the CPU 12 reads out the first image taken (step S35), performs a face detection process on the image (step S36), and sets a focus area at the position of the detected face (step S37).

Then, the CPU 12 calculates focus evaluation values in the focus area set for all images. That is, the CPU 12 sequentially reads out the image data temporarily stored in the main memory 18 (step S38) and calculates the focus evaluation value in the set focus area (step S39). The calculated focus evaluation value is associated with the image data and stored in the main memory 18.

Every time calculation of a focus evaluation value is completed, the CPU 12 determines whether the focusing evaluation values for all image data have been calculated (step S40). When the CPU 12 determines that the focus evaluation values for all image data have been calculated, the CPU 12 chooses the image with the highest focus evaluation value among the images taken as an in-focus image (step S41) and records the chosen image in a storage medium 40 (step S42).

In this way, face detection may be performed only in the first image taken and a focus area may be set on the basis of the result the detection. This can reduce the overall processing time.

If a focus area is set based only on a particular image in this way, a displacement of the position of the face due to a movement of the subject or camera shake can make accurate evaluation of focus impossible.

Therefore, when the focus area is set based only on a particular image, preferably a motion vector with respect to the particular image is obtained and the focus area is corrected as appropriate, as shown in FIGS. 5A and 5B.

The motion vector can be obtained by using feature point tracking, for example. Any of various methods of tracking feature points may be used. For example, points with high standard deviations in a given area at the location of a human face detected in Image 1 (shown in FIG. 5A) are extracted as feature points. Block matching can be used to track the feature points to identify the positions to which the feature points have moved in Image 2 (shown in FIG. 5B). In the block matching method, coordinates in Image 2 at which the smallest sums of absolute differences are found, are obtained as image data in the given area including the feature points in Image 1.

The image (Image 1) used as the reference for obtaining the motion vector does not necessarily need to be the reference image used for determining a focus area. One of the images taken can be used as the reference to obtain the motion vector.

Figure 6:
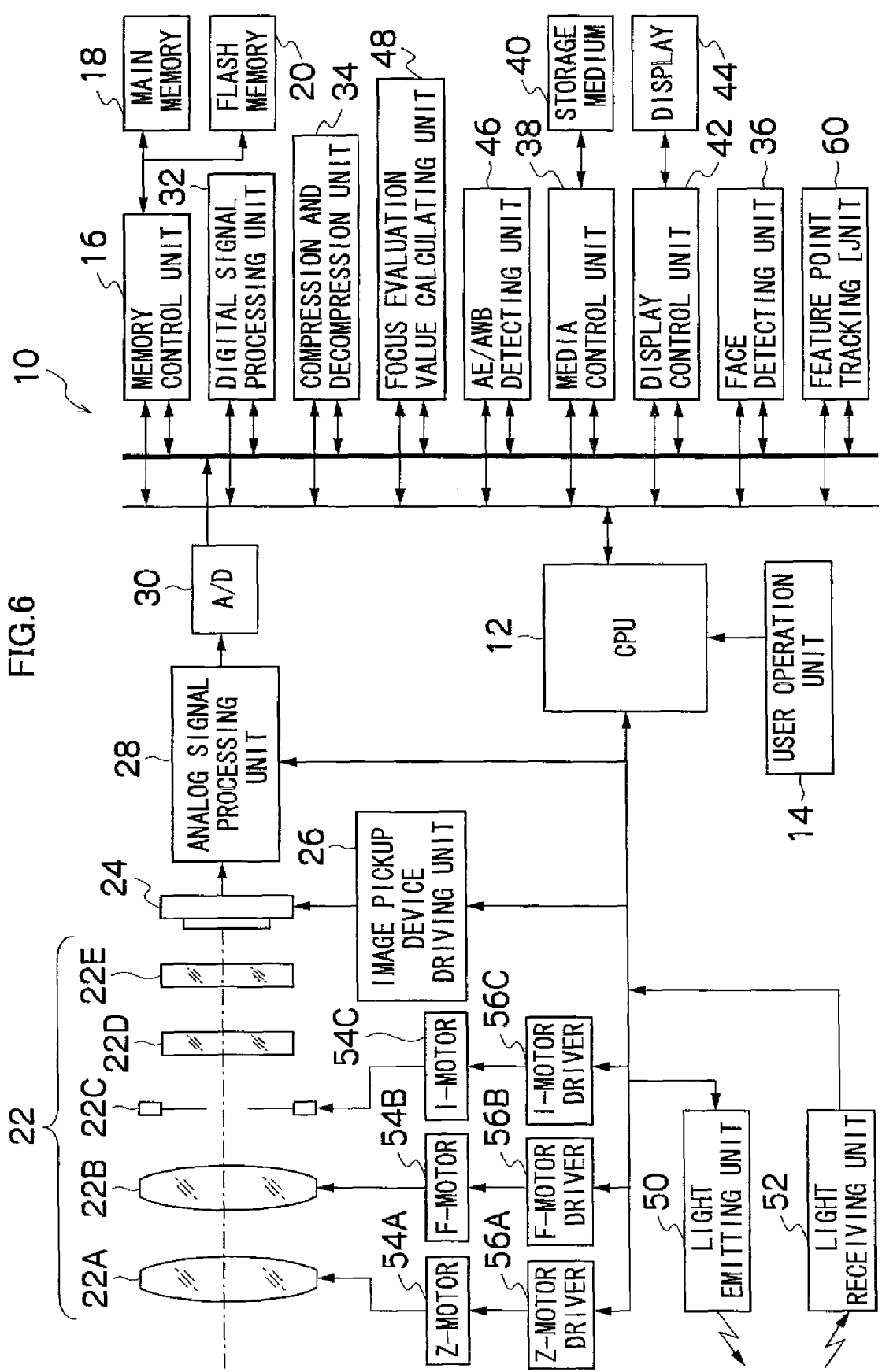
FIG. 6 is a block diagram showing an example of a digital camera including the function of correcting a focus area.

FIG. 6 is a block diagram showing an example of a digital camera including the focus area correction function.

As shown, the digital camera includes a feature point tracking unit 60 which tracks feature points with respect to a reference image to detect motion vectors for images.

A CPU 12 provides image data of the reference image and image data of an image for which a motion vector with respect to the reference image is to be obtained to the feature point tracking unit 60. The feature point tracking unit 60 tracks feature points on the image data obtained, calculates a motion vector with respect to the reference image, and outputs the motion vector to the CPU 12.

While a motion vector of each image is calculated with respect to a reference image used for determining a focus area in this example, the reference image used for calculating the motion vector as described above is not limited to this.

Figure 7:
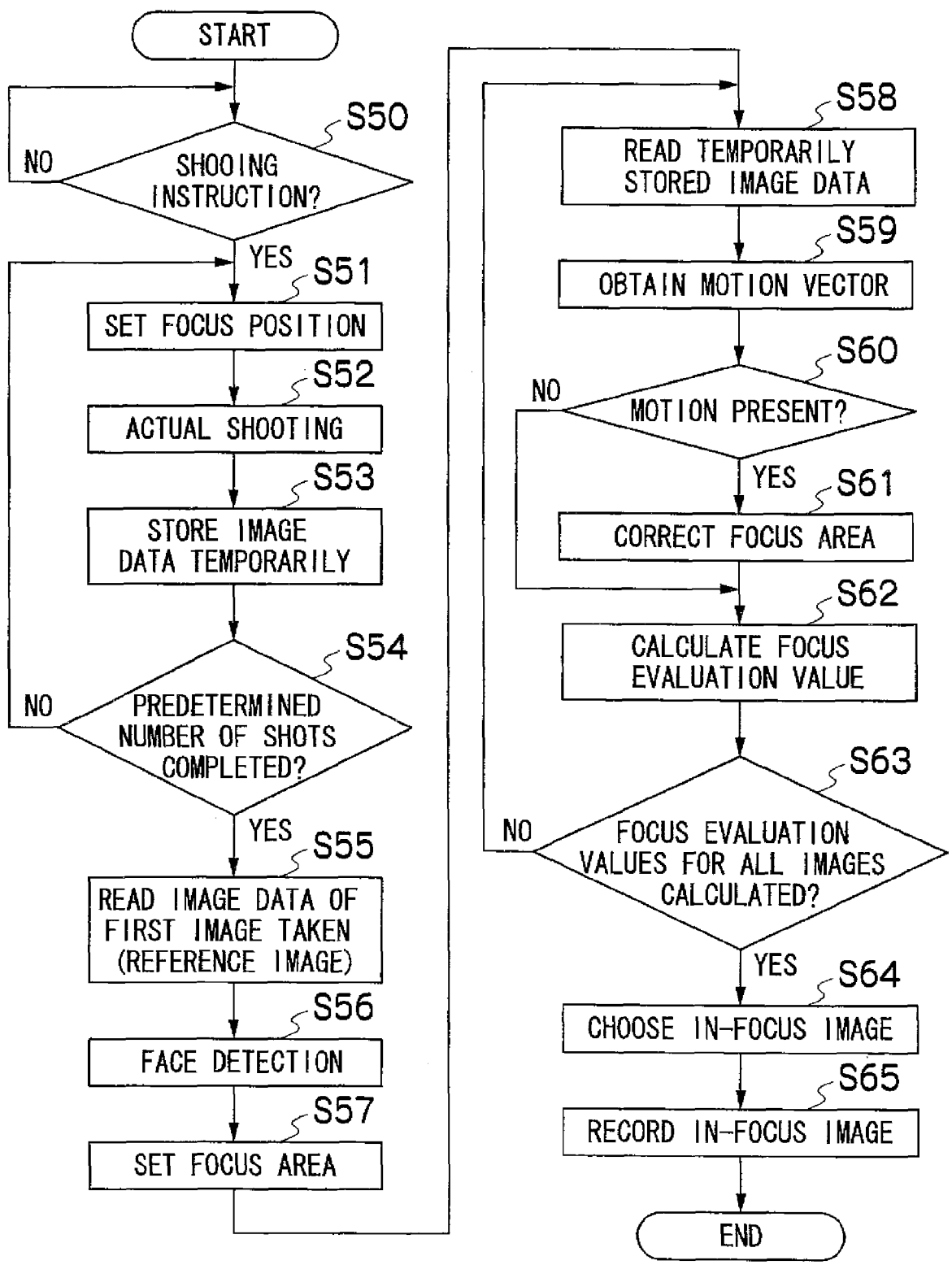
FIG. 7 is a flowchart showing a process procedure for correcting a focus area and calculating focus evaluation values.

FIG. 7 is a flowchart showing a process procedure for correcting a focus area and calculating a focus evaluation value.

When the camera is placed in the focus bracketing mode, the CPU 12 determines on the basis of an input from the user operation unit 14 whether an instruction to perform actual shooting has been input (step S50).

When the instruction is input, the CPU 12 performs a process for taking a predetermined number of images with different focus positions (steps S51 through S54). The process is the same as the process from step S11 through step S14 of the first embodiment.

Once the predetermined number of images have been taken with different focus positions, the CPU 12 reads out the first image taken (step S55), face detection is performed in the image (step S56), and sets a focus area at a detected face (step S57).

The CPU 12 then calculates focus evaluation values for all images in the set focus area. In the process, the CPU 12 obtains motion vectors with respect to the reference image and calculates the focus evaluation values while correcting the focus area as needed.

First, the CPU 12 reads out the image data temporarily stored in the main memory 18 (step S58) and provides the image data to the feature point tracking unit 60 to detect a motion vector (step S59). The CPU 12 determines on the basis of the obtained motion vector whether there is a motion with respect to the reference image (step S60).

If the CPU 12 determines that there is a motion, the CPU 12 corrects the focus area on the basis of the obtained motion vector (step S61) and calculates the focus evaluation value in the corrected focus area (step S62).

On the other hand, if the CPU 12 determines there is not a motion, the CPU 12 calculates the focus evaluation value in the focus area set for the reference image without correction (step S62).

The CPU 12 stores the calculated focus evaluation value in the main memory 18 in association with the image data.

Every time calculation of a focus evaluation value is completed, the CPU 12 determines whether focus evaluation values for all image data have been calculated (step S63). When the CPU 12 determines that focus evaluation values for all shot image data have been calculated, the CPU 12 chooses the image with the highest focus evaluation value among the images taken as an in-focus image (step S64) and records the image in the storage medium 40 (step S65).

By correcting the focus area as appropriate in response to motions in images in this way, accurate focus evaluation can be performed.

The method for obtaining motion vectors with respect to the reference image is not limited to the feature tracking method described above. For example, if a motion in a image (face) is merely due to a camera shake, then the CPU 12 may use a signal from a gyro sensor 62 provided in the digital camera as shown in FIG. 8 to determine in which direction the camera has moved between the moment of taking image 1 (reference image) and the moment of taking image 2 (image to be compared). Based on the information, the position in image 2 to which the face detected in image 1 has moved can be roughly determined.

Alternatively, an acceleration sensor may be used to detect motions of the camera in the vertical directions (Y directions) and the horizontal directions (X directions) and the direction in which the camera has moved between the moment of taking image 1 (reference image) and the moment of taking image 2 (image to be compared) can be determined by the CPU 12 on the basis of the detection. Based on the information, the position in Image 2 to which the face detected in image 1 has moved can be roughly determined. Alternatively, yawing and pitching of the camera can be detected by an angular speed sensor and the direction in which the camera has moved between the moment of taking of image 1 (reference image) and the moment of taking image 2 (image to be compared) can be determined by the CPU 12. Based on the information, the position in image 2 to which the face detected in Image 1 has moved can be roughly determined.

Figure 9A:
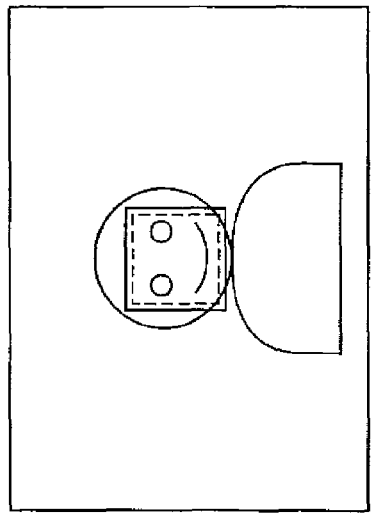
FIGS. 9A to 9D are diagrams for illustrating a method for correcting an image.
Figure 9B:
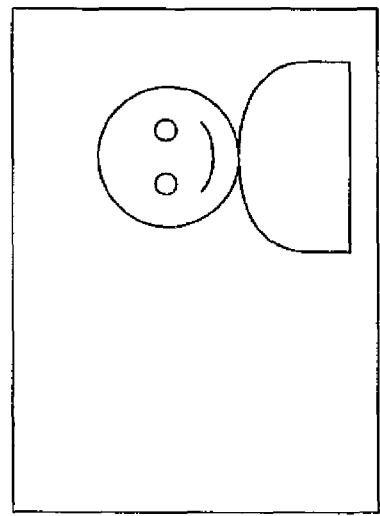
Figure 9C:
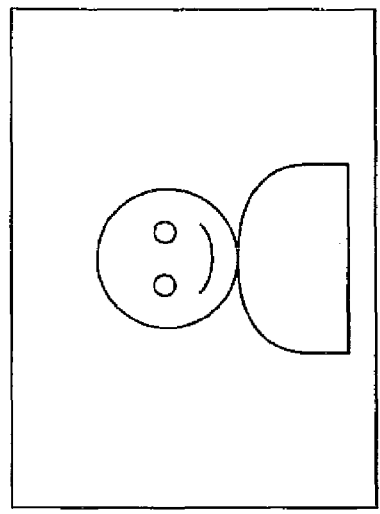
Figure 9D:
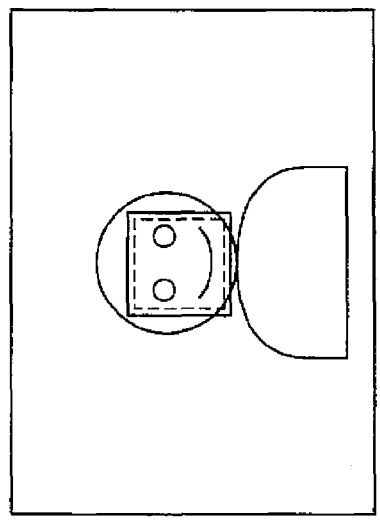

While the focus area is corrected as appropriate in response to a motion of the subject or a camera shake to enable accurate focus evaluation in the example, the same effect can be provided by correcting a whole image in response to a motion of the subject or a camera shake. For example, as shown in FIGS. 9A to 9D, if the position of a human face in image 2 (FIG. 9B, an image to be corrected) has been displaced with respect to the position in image 1 (FIG. 9A), which is the reference image, the motion vector of image 2 with respect to image 1 is obtained and the whole image is shifted to compensate the displacement on the basis of the obtained motion vector, thereby correcting the image (FIG. 9C). Then, a focus area is set on the corrected image (FIG. 9D). The focus area can be properly set with this method as well.

The motion vector in the example also can be obtained by using feature point tracking or from an output from a gyro sensor.

The reference image (the image used as the reference for correction) does not necessarily need to be a reference image for determining a focus area. Motion vectors can be obtained with respect to any one of the images taken.

Third Embodiment

A process performed when more than one person is included in an image will be described in a third embodiment.

If multiple people are in an image, the person with the highest face evaluation value is determined as the main subject and a focus area is set at the face of the person.

However, face detection performed in all images obtained by using focus bracketing does not necessarily produce the same results.

Figure 10A:
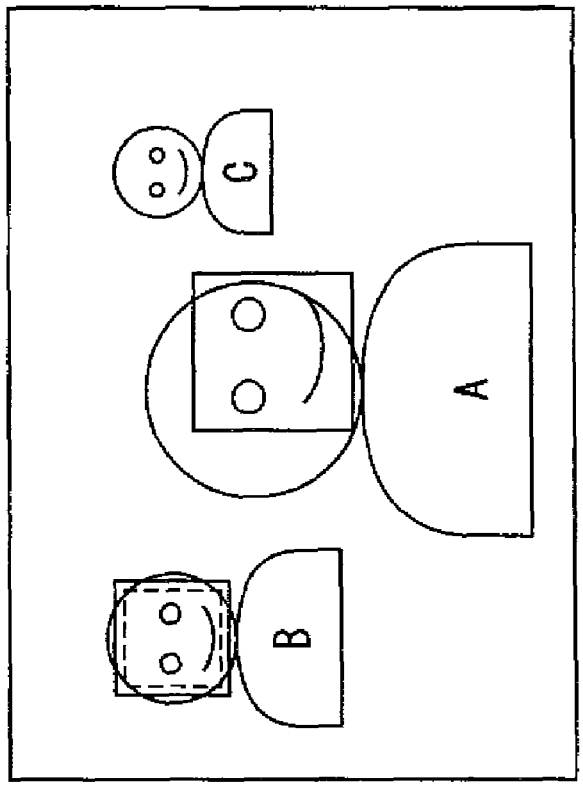
FIGS. 10A and 10B are diagrams showing a result of face detection in an image including more than one person.
Figure 10B:
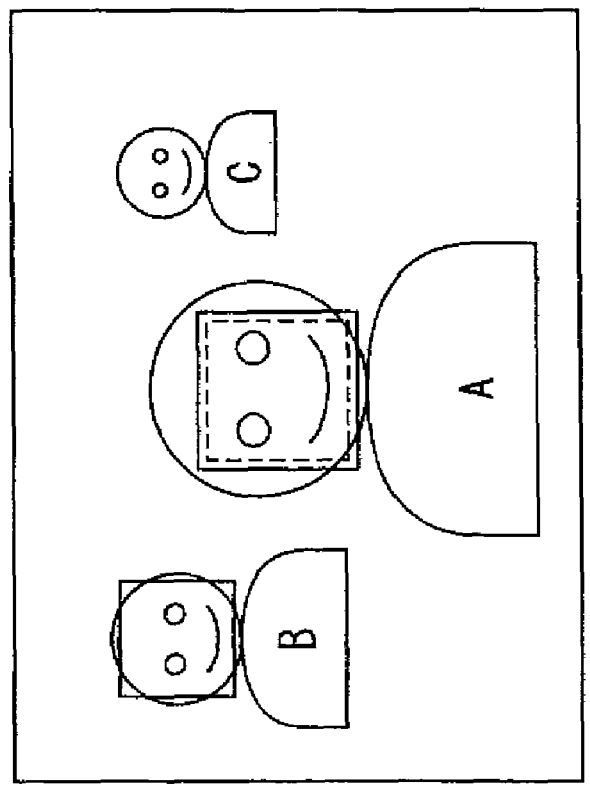

For example, the face of person A may be given the highest face evaluation value in the first image 1 (FIG. 10A) whereas the face of person B may be the highest face evaluation value in the next image 2 (FIG. 10B), as shown in FIGS. 10A and 10B. The cause may be a difference in degree of focus between images 1 and 2 caused by the focus bracketing or that the difference between the face of person A and an average face has been increased because person A has turned the head slightly away or moved.

The same face position needs to be used as a focus area because proper focus evaluation generally cannot be made by comparing different faces. If the same human face cannot be detected in multiple images merely by face detection, the results of face detection obtained in the images need to be considered in a comprehensive manner to determine a focus area.

One way to determine the focus area is to choose the human face with the highest face evaluation value in each image and set the focus area at the face of the person that has been chosen the most times (first method). FIG. 11 illustrates this method. For example, as shown in FIG. 11, if five images ware taken and the face of person A was given the highest face evaluation value in the first image 1 taken, the face of person B was given the highest face evaluation value in the second image 2 taken, the face of person A was given the highest face evaluation value in the third image 3 taken, the face of person A is given the highest face evaluation value in the fourth image 4 taken, and the face of person A was given the highest face evaluation value in the fifth image 5 taken, then a focus area is set at the face of person A because the face of person A was given the highest face evaluation value the most times in the images.

Another method is to calculate the average of the face evaluation values for the face of each person detected in each image and set the focus area at the face of the person with the highest average of the face evaluation values (second method). For example, FIG. 12 shows changes of face evaluation values for the faces of three people (A, B, and C) with high face evaluation values. If the face evaluation values in images 3 and 4 alone were used for evaluation, face B would be chosen. However, the face of person A has the highest average of the face evaluation values in the images and therefore the focus area is set at the face of person A.

Yet another method is to set a focus area at the face of the person with the highest face evaluation value in the first image taken (third method). Since the first image taken in general is more likely to have scene conditions (such as the position and direction of a human face) intended by the user as mentioned above, the evaluation in the first image taken is given priority and the focus area is set at the face of the person with the highest face evaluation value in the image.

Figure 13:
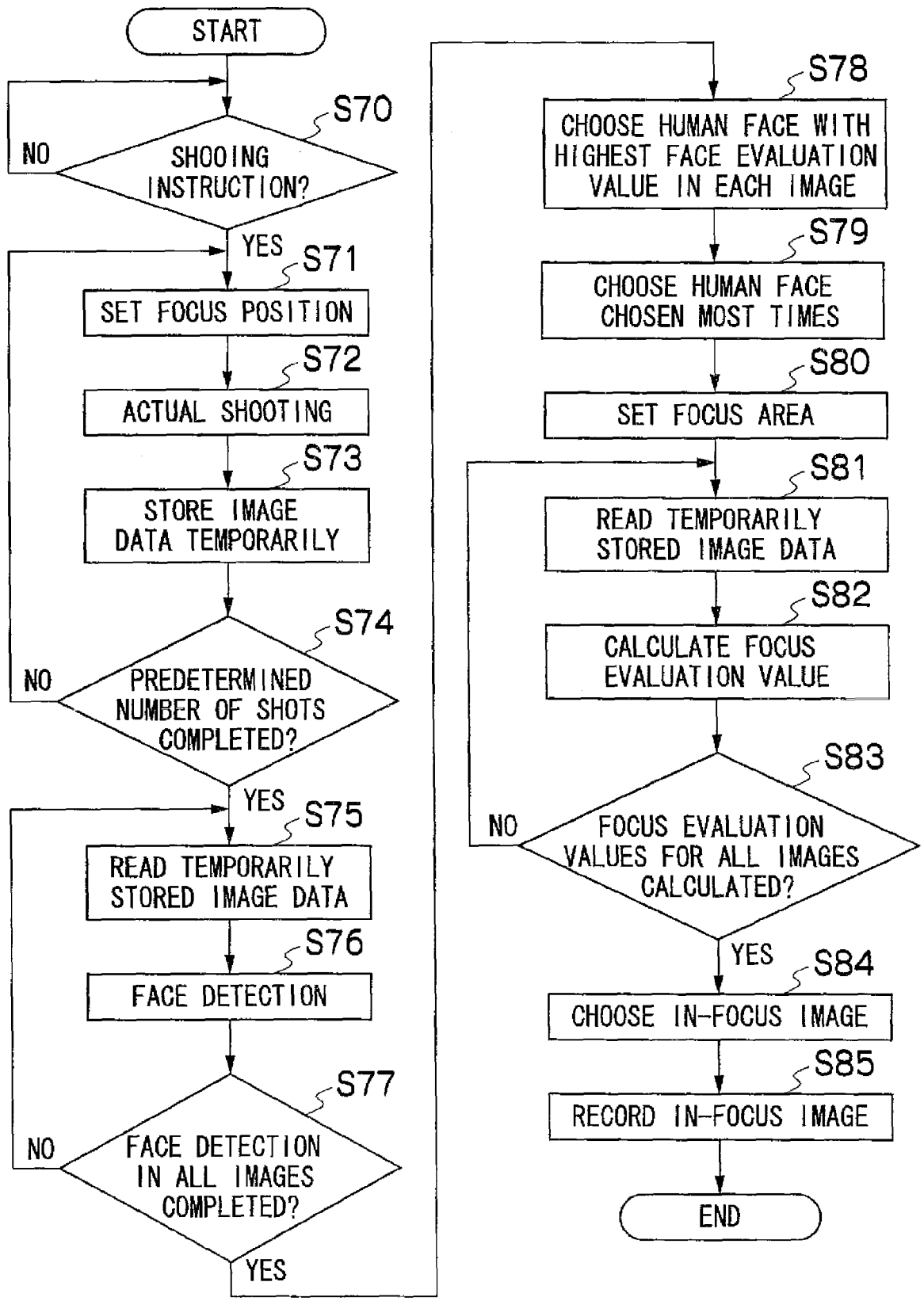
FIG. 13 is a flowchart showing a process procedure for setting a focus area for an image including more than one person by using the first method and calculating focus evaluation values.

FIG. 13 is a flowchart showing a process procedure for setting a focus area using the first method described above to calculate focus evaluation values when more than one person is included in images.

When the camera is placed in the focus bracketing mode, a CPU 12 determines on the basis of an input from a user operation unit 14 whether an instruction to perform actual shooting has been input (step S70).

When the instruction is input, the CPU 12 performs a process for taking a predetermined number of images with different focus positions (steps S71 through step S74). The process is the same as the process from step S11 through step S14 of the first embodiment.

Once the predetermined number of images have been taken with different focus positions, the CPU 12 performs a process for detecting a face in each of the images taken (steps S75 through S77). That is, the CPU 12 sequentially reads out the images temporarily stored in the main memory 18 (step S75) and calculates face evaluation values from the read images to detect human faces (step S76).

In the example, information on the face evaluation values will be required in the subsequent process and therefore is held along with information on the detected faces.

In addition, since more than one human face is detected in the example, the detected faces in each image are numbered and the face evaluation values are stored in association with the face information. The numbers are stored in the main memory 18 in association with information on the images in which the faces were detected.

Every time the face detection process in each image is completed, the CPU 12 determines whether the face detection process in all images has been completed (step S77).

When the CPU 12 determines that the face detection process in all images has been completed, the CPU 12 then chooses the human face with the highest face evaluation value in each image (step S78). Then, the CPU 12 chooses the human face that has been chosen the most times (step S79).

The human face thus chosen is the main subject and a focus area is set at the human face (step S80). The focus area is set in the reference image so as to enclose the human face. The reference image may be the first image taken among the images.

The CPU 12 calculates focus evaluation values in all images in the focus area thus set. That is, the CPU 12 sequentially reads out the image data temporarily stored in the main memory 18 (step S81) and calculates focus evaluation values in the set focus area (step S82). The calculated focus evaluation values are associated With the image data and stored in the main memory 18.

Every time calculation of a focus evaluation value is completed, the CPU 12 determines whether calculation of focus evaluation values for all image data has been completed (step S83). When the CPU 12 determines that the calculation of focus evaluation values for all shot image data has been completed, the CPU 12 chooses the image with the highest focus evaluation value among the images taken as an in-focus image (step S84) and records the chosen image on the storage medium 40 (step S85).

In this way, when images include more than one person, the human face with the highest face evaluation value in each of the images is chosen and then a focus area is set at the human face that has been chosen the most times. Thus, the focus area can be set appropriately. In addition, since focus evaluation can be made using the focus area common to the images, an accurate determination can be made as to whether the images are in focus or not.

Figure 14:
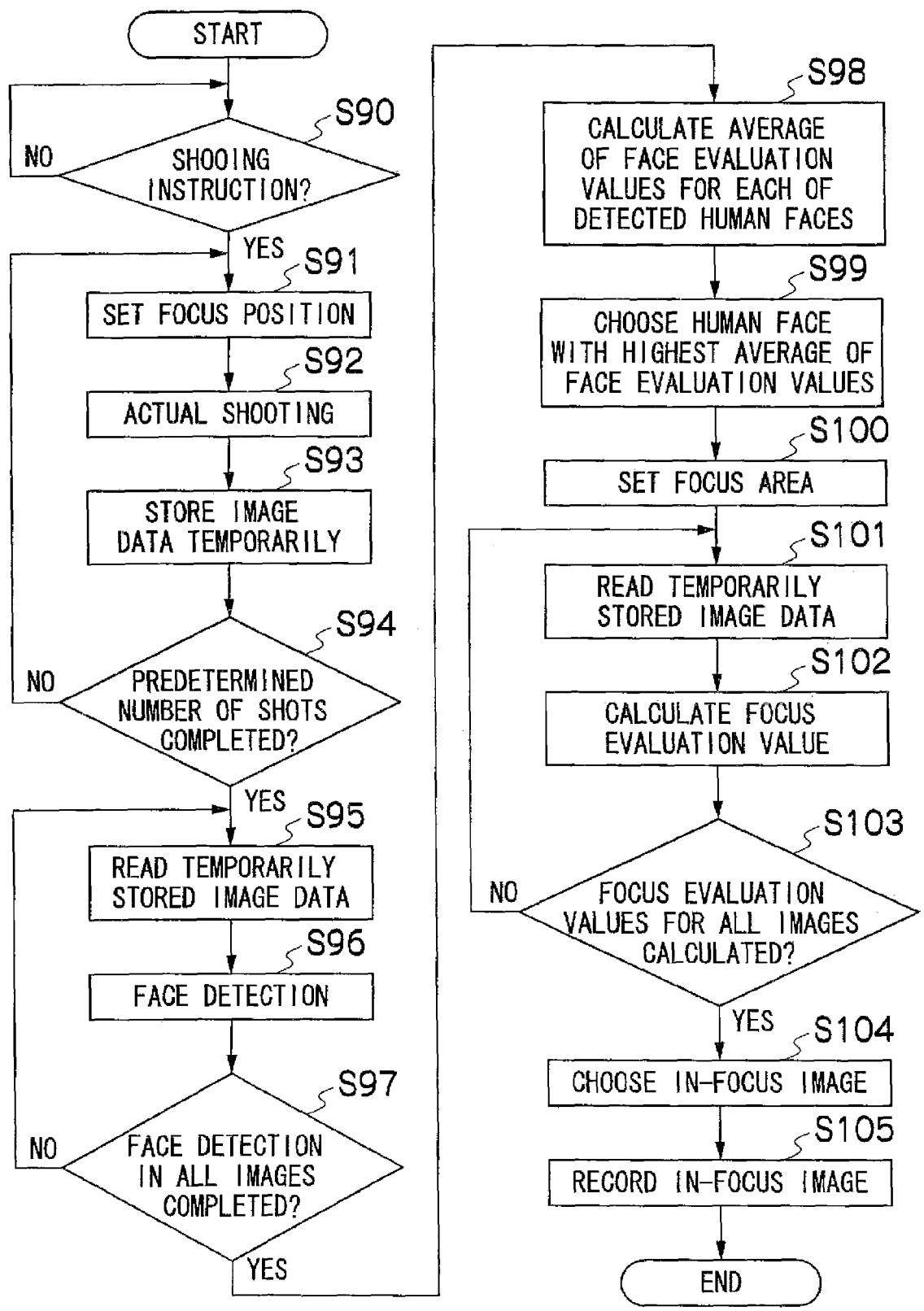
FIG. 14 is a flowchart showing a process procedure for setting a focus area for an image including more than one person by using the second method and calculating focus evaluation values.

FIG. 14 is a flowchart showing a process procedure for setting focus area by using the second method and calculating focus evaluation values in images including more than one person.

When the camera is placed in the focus bracketing mode, the CPU 12 determines on the basis of an input from the user operation unit 14 whether an instruction to perform actual shooting has been input (step S90).

When the instruction is input, the CPU 12 performs a process for taking a predetermined number of images with different focus positions (steps S91 through S94). The process is the same as that from step S11 through S14 of the first embodiment described earlier.

Once the shooting of the predetermined number of images with different focus positions has been completed, the CPU 12 performs a process for detecting faces in each of the images (steps S95 through S97). That is, the CPU 12 sequentially reads out the images temporarily stored in the main memory 18 (step S95) and calculates face evaluation values from the read images to detect human faces (step S96).

As in the first method described above, face evaluation value information obtained in the face detection process will be required in a subsequent step and therefore is held along with information on the detected faces. In addition, since more than one human face is detected in the example, the detected faces in each image are numbered and the face evaluation values are stored in association with the face information. The numbers are stored in the main memory 18 in association with information on the images in which the faces were detected.

Every time the face detection process in each image is completed, the CPU 12 determines whether the face detection process in all images has been completed (step S97).

When the CPU 12 determines that the face detection process in all images has been completed, the CPU 12 calculates the average of the face evaluation values for each of the detected faces of people (step S98). The CPU 12 chooses the face of the person with the highest average of face evaluation values (step S99).

The face of the person thus chosen is the main subject and a focus area is set at the face of the person (step S100). The focus area is set on the reference image so as to enclose the face of the person. The reference image may be the first image taken in the images.

The CPU 12 calculates focus evaluation values in all images in the focus area thus set. That is the CPU 12 sequentially reads out the image data temporarily stored in the main memory 18 (step S101) and calculates focus evaluation values in the set focus area (step S102). The calculated focus evaluation values are associated with the image data and stored in the main memory 18.

Every time calculation of a focus evaluation value is completed, the CPU 12 determines whether calculation of focus evaluation values for all image data has been completed (step S103). When the CPU 12 determines that the calculation of focus evaluation values for all shot image data has been completed, the CPU 12 chooses the image with the highest focus evaluation value among the images taken as an in-focus image (step S104) and records the chosen image on the storage medium 40 (step S105).

In this way, when images include more than one person, a focus area is set at the face of the person with the highest average of face evaluation values among the detected human faces. Thus, the focus area can be set appropriately. In addition, since focus evaluation can be made using the focus area common to the images, an accurate determination can be made as to whether the images are in focus or not.

When the averages of face evaluation values are calculated as in the example, the averages may be calculated for a limited number of the human faces with higher face evaluation values, rather than calculating the averages for all of the detected human faces.

Furthermore, when the averages of face evaluation values are calculated as in the example, weights proportional to the levels of importance of human faces detected in each image may be assigned to the face evaluation values of the human faces for calculating the averages (the so-called weighted averages). For example, a higher weight may be assigned to the face evaluation values in the first image taken for calculating the average. Since the first image taken in general is more likely to have scene conditions (such as the position and direction of a human face) intended by the user, the face evaluation values in the first image taken can be assigned higher weights to calculates the averages to improve the possibility that the face or eyes of the person intended by the photographer will be chosen. Alternatively, the highest weight may be assigned to the face evaluation values in the first image taken and the second highest weight may be assigned to the next image taken and so on for calculating the averages.

The exemplary embodiment described above is one example of weighted averaging in which an equal weight is assigned to the face evaluation values to calculate the average.

Figure 15:
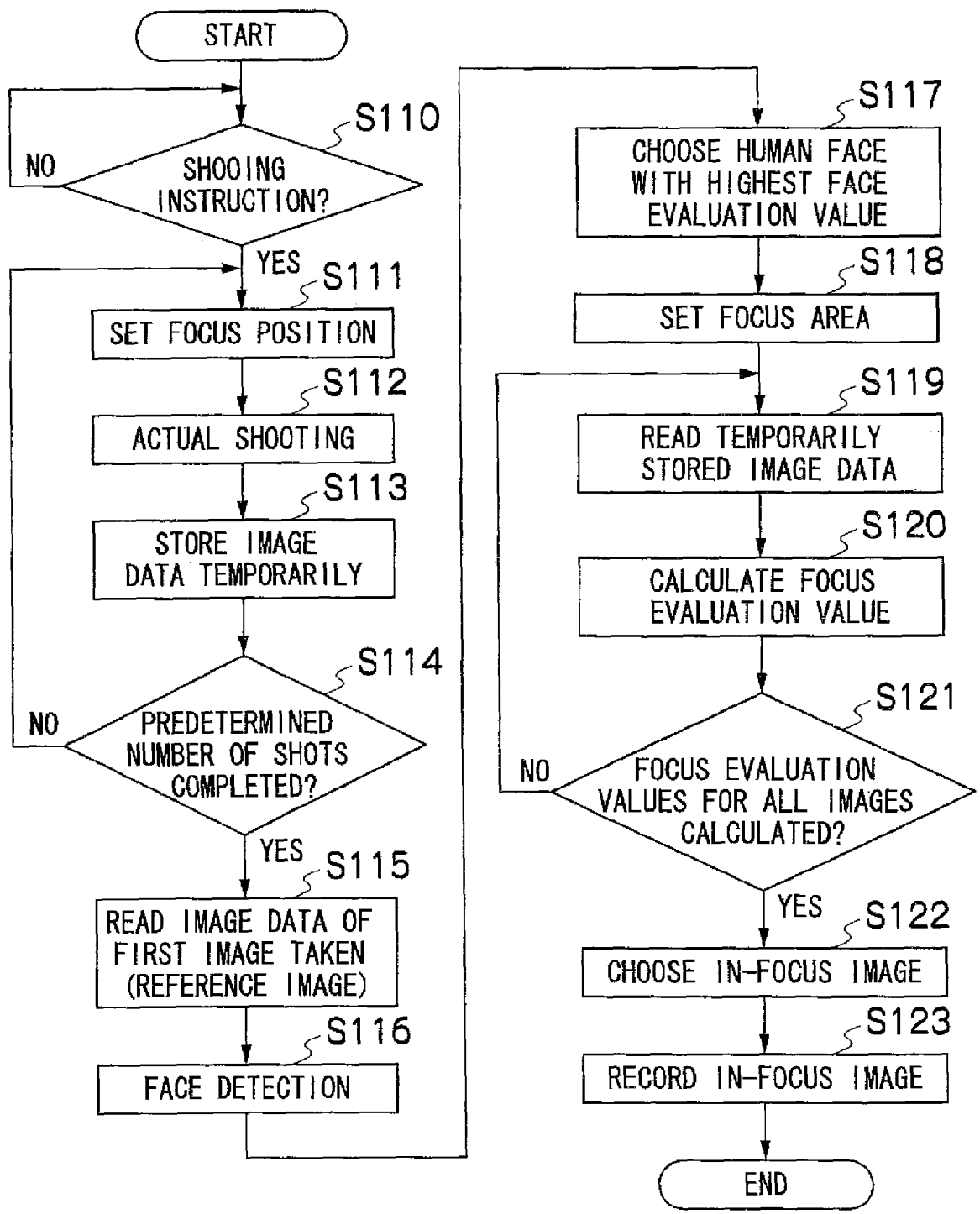
FIG. 15 is a flowchart showing a process procedure for setting a focus area for an image including more than one person by using a third method and calculating focus evaluation values.

FIG. 15 is a flowchart showing a process procedure for setting a focus area by using the third method to calculate focus evaluation values in images including more than on person.

When the camera is placed in the focus bracketing mode, the CPU 12 determines on the basis of an input from the user operation unit 14 whether an instruction to perform actual shooting has been input (step S110).

When the instruction is input, the CPU 12 performs a process for taking a predetermined number of images with different focus positions (steps S111 through step 114). The process is the same as the process from step S111 through step S14 of the first embodiment.

Once the predetermined number of images have been shot with different focus positions, the CPU 12 reads out the first image taken (step S115) and performs a face detection process on the image (step S116). The CPU 12 chooses the face with the highest face evaluation value among the detected faces (step S117).

The human face thus chosen is the main subject and a focus area is set at the human face (step S118).

The CPU 12 calculates focus evaluation values for all images in the focus area thus set. That is, the CPU 12 sequentially reads out the image data temporarily stored in the main memory 18 (step S119) and calculates focus evaluation values in the set focus area (step S120). The calculated focus evaluation values are associated with the image data and stored in the main memory 18.

Every time calculation of a focus evaluation value is completed, the CPU 12 determines whether calculation of focus evaluation values for all image data has been completed (step S121). When the CPU 12 determines that the calculation of focus evaluation values for all shot image data has been completed, the CPU 12 chooses the image with the highest focus evaluation value among the images taken as an in-focus image (step S122) and records the chosen image on the storage medium 40 (step S123).

By performing face detection only on the first image taken and setting the focus area at the human face with the highest face evaluation value in the image in this way, the focus area can be set appropriately. In addition, since focus evaluation can be made using the focus area common to the images, an accurate determination can be made as to whether the images are in focus or not. Furthermore, since the face detection process is performed only on the first image taken, the whole processing time can be reduced.

When a focus area is set by using any of the first to third methods, position of the face can be displaced due to a motion of the subject or a camera shake, making accurate evaluation of focus impossible. Therefore, preferably, motion vector information is obtained and the focus area or whole image is corrected as appropriate, as described with respect to the second embodiment.

Fourth Embodiment

In the embodiments describe above, an image chosen as an in-focus image is directly stored in the storage medium 40.

In a fourth embodiment, rather than directly recording a chosen in-focus image on a storage medium 40, a preview display of the chosen in-focus image is displayed first on the display 44 to ask a user whether the user wants to record the image and, only if the user indicates that the user wants to record the image, the image is stored in the storage medium 40.

Figure 16:
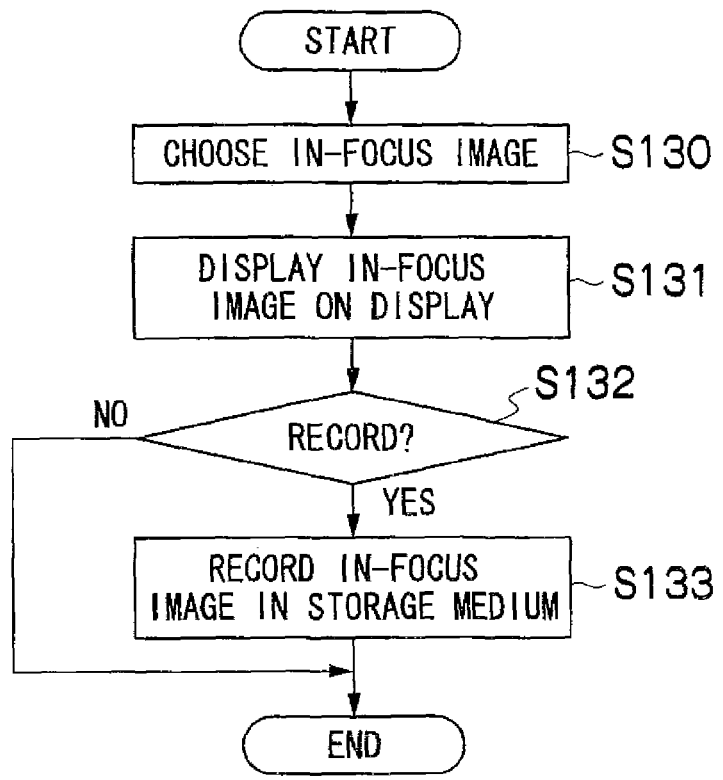
FIG. 16 is a flowchart showing a process procedure for recording an in-focus image after the in-focus image is chosen.

FIG. 16 is a flowchart showing a process procedure for recording an in-focus image chosen.

When an in-focus image is chosen (step S130), the CPU 12 displays the in-focus image on the display 44 (step S131).

Figure 17:
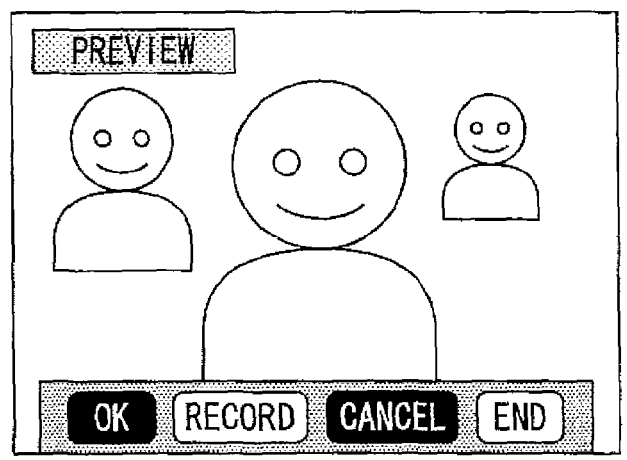
FIG. 17 is a diagram showing an exemplary display of an in-focus image on a display unit.

FIG. 17 shows an example of the display. The chosen in-focus image is displayed on the display 44 as shown. A message asking whether to record the in-focus image is superimposed on the image on the display screen. Based on the display, the user indicates whether to record the in-focus image. In this example, pressing the OK button on the user operation unit 14 indicates to record the in-focus image; pressing the cancel button indicates to discard the in-focus image (indicates that the in-focus image is not necessary).

The CPU 12 determines on the basis of the input from the user operation unit 14 whether the in-focus image should be recorded (step S132). If the CPU 12 determines that the in-focus image should be recorded, the CPU 12 records the image data of the in-focus image being displayed on the display 44 in the storage medium 40 (step S133). On the other hand, if the CPU 12 determines that the in-focus image does not need to be recorded, the CPU 12 will end the process without recording the image.

By allowing the user to preview the chosen in-focus image in this way, recording of an unnecessary image can be prevented.

Figure 18:
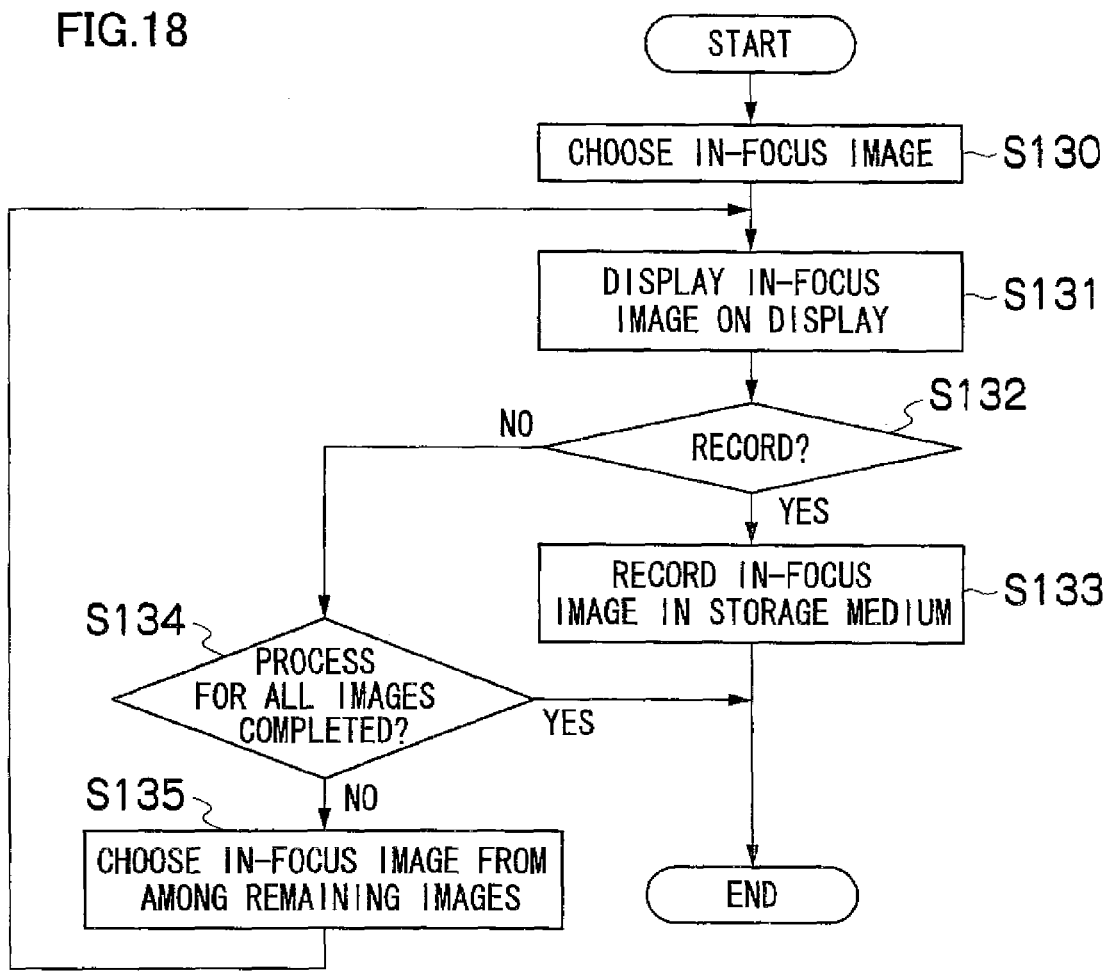
FIG. 18 is a flowchart showing another process procedure for recording an in-focus image after the in-focus image is selected.

FIG. 18 is a flowchart showing another process procedure for recording an in-focus image chosen.

The process in the example described above will end when the user indicates that recording of the image is not necessary. In the example described below, when the user indicates that recording of the image is not necessary, the image with the second highest focus evaluation value is chosen from among the remaining images and is displayed on the display 44 to ask the user whether to record the image.

As shown in FIG. 18, when the user indicates at step S132 that the image does not need to be recorded, the CPU 12 determines whether all images have been displayed (step S134). That is, in the example, images are displayed one by one in descending order of focus evaluation values and therefore determination is made first as to whether there is an additional image that has not yet been displayed.

When all image have been displayed, the CPU 12 determines that there is no additional image to record and will end the process.

On the other hand, when the CPU 12 determines that not all images have been displayed, the CPU 12 chooses the image with the next highest focus evaluation value among the images excluding the images that have been already displayed (step S135). That is, the CPU 12 chooses the image with the highest focus evaluation value as an in-focus image among the remaining images excluding those that have been already displayed.

Then, the CPU 12 displays the chosen in-focus image on the display 44 (step S131). The user indicates whether or not to record the newly displayed image.

The CPU 12 determines on the basis of the input from the user operation unit 140 whether the in-focus image should be recorded (S132). If the CPU 12 determines that the in-focus image should be recorded, the CPU 12 records the in-focus image being displayed on the display 44 in the storage medium 40 (step S133).

In this way, when the user does not instruct to record an image automatically chosen as an in-focus image, the image with the next highest focus evaluation value is displayed to ask the user whether or not to record the image. Thus, a desired image can be efficiently recorded without having to perform cumbersome operations.

Figure 19:
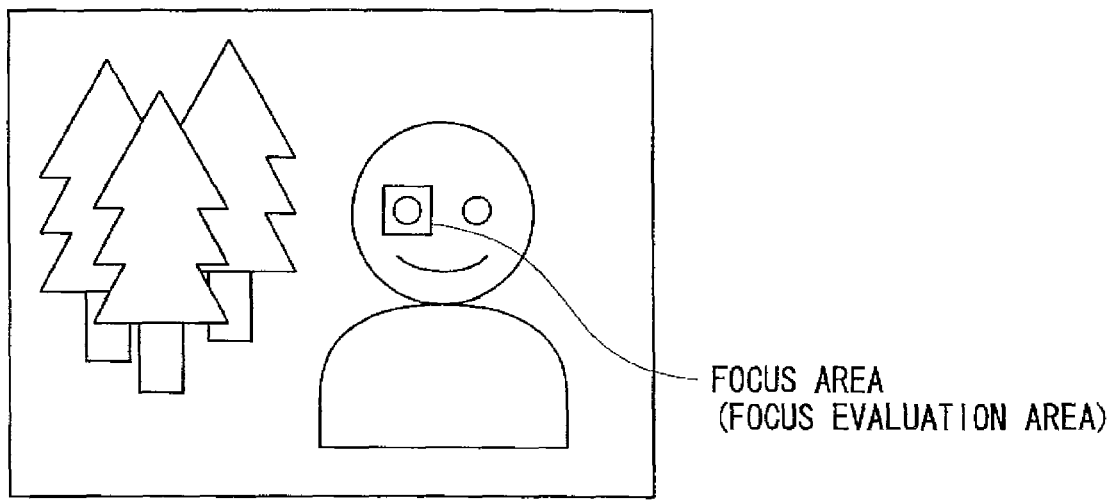
FIG. 19 is a diagram showing an exemplary setting of a focus area.

While a human face is detected in an image and a focus area is set that encloses the detected face in the embodiments described above, an eye of a person may be detected in an image and a focus area may be set that encloses the detected eye as shown in FIG. 19. This embodiment will provide the same effects as those in the embodiments described above.

Eye detection can be accomplished by a method in which information on shades of an average eye is stored beforehand and information on the difference between the shade information and information on shades in a particular area is calculated as an eye evaluation value. The eye evaluation value is calculated as needed while moving the particular area around the image, and the location with the highest eye evaluation value (that is the location where the difference from the average eye shade information is the smallest) is determined as the location of an eye.

The focus area that encloses both of left and right eyes or the focus area that encloses one of the eyes may be set.

While the embodiments have been described with respect to an example in which the present invention is applied to a digital camera, the present invention is not limited to the application. The present invention can also be applied to digital video cameras as well as electronic apparatuses including an imaging function such as mobile phones with camera.

What is claimed is:

1. An image-taking method for taking an image including a person, comprising:
    taking a plurality of images for recording at once with different focus positions in accordance with an instruction for shooting and recording a plurality of the images for recording taken in a memory for temporal storage;
    detecting a human face or eye in a reference image being a particular image among a plurality of images recorded in the memory for temporal storage for recording and setting an area enclosing the detected human face or eye as a focus evaluation area after all the multiple images for recording are taken and all the taken images for recording are recorded in the memory for temporal storage;
    calculating a focus evaluation value in the focus evaluation area of each of the plurality of images recorded in the memory for temporal storage for recording;
    choosing an image for recording with the highest focus evaluation value; and
    recording the chosen image for recording in the memory for recording.

2. The image-taking method according claim 1, further comprising:
    obtaining a motion vector for each of the images; and
    correcting a focus evaluation area set in each image for recording or each whole image on the basis of the obtained motion vector.

3. The image-taking method according to claim 2, wherein the motion vector is obtained by feature point tracking.

4. The image-taking method according to claim 2, wherein the motion vector is calculated on the basis of an output from a detecting device which detects a shake of an image-taking apparatus.

5. An image-taking method for taking an image including a plurality of people, comprising:
    taking a plurality of images for recording at once with different focus positions in accordance with an instruction for shooting and recording a plurality of the images for recording taken in a memory for temporal storage;
    calculating an evaluation value representing the likelihood of being a face or eye in each of the plurality images for recording recorded in the memory for temporal storage after all the multiple images for recording are taken and all the taken mages for recording are recorded in the memory for temporal storage to detect a human face or eye;
    calculating a weighted average of the evaluation value representing the likelihood of being a face or an eye from among the detected human faces or eyes, choosing a human face or eye with the highest weighted average of evaluation values representing the likelihood of a face or eye and setting an area enclosing the face or eye in a reference image being a particular image among the plurality of images for recording recorded in the memory for temporal storage, as a focus evaluation area;

calculating a focus evaluation value in the focus evaluation area of each of the plurality of images for recording recorded on the memory for temporal storage;

choosing an image for recording with the highest focus evaluation value; and recording the chosen image for recording in a memory for recording.

6. An image-taking method for taking an image including a plurality of people, comprising:

taking a plurality of images for recording at once with different focus positions in accordance with an instruction for shooting and recording a plurality of the images for recording taken in a memory for temporal storage;

calculating an evaluation value representing the likelihood of being a face or eye in each of the plurality of images for recording recorded on the memory for temporal storage after all the multiple images for recording are taken and all the taken images for recording are recorded in the memory for temporal storage to detect is human face or eye;

choosing a human face or eye with the highest evaluation value representing the likelihood of a face or eye in each of the images for recording taken;

choosing a human face or eye being chosen the most times as a human face or eye with a high evaluation value representing the likelihood of being a face or an eye and setting an area enclosing the human face or eye in a reference image being a particular image for recording among the images for recording taken, as a focus evaluation area;

calculating a focus evaluation value in the focus evaluation area of each of the images for recording recorded on the memory for temporal storage;

choosing an image for recording with the highest evaluation value; and recording the chosen image for recording in a memory for recording.

7. An image-taking method for taking an image including a plurality of people, comprising:

taking a plurality of images for recording at once with different focus positions in accordance with an instruction for shooting and recording a plurality of the images for recording taken in a memory for temporal storage;

calculating an evaluation value representing the likelihood of being a face or eye from a reference image being a particular image for recording among the plurality of images recorded on the memory for temporal storage, after all the multiple images for recording are taken and all the taken images for recording are recorded in the memory for temporal storage to detect human faces or eyes;

choosing a human face or eye with the highest evaluation value representing the likelihood of being a face or an eye from among the detected human faces or eyes and setting an area enclosing the human face or eye in the reference image as a focus evaluation area;

calculating a focus evaluation value in the focus evaluation area of each of the images for recording recorded on the memory for temporal storage;

choosing an image for recording with the highest focus evaluation value; and recording the chosen image for recording in a memory for recording.

8. An image-taking method for taking an image including a person, comprising:

taking a plurality of images with different focus positions;

detecting a human face or eye in each of the images taken, setting an area enclosing the detected human face or eye as a focus evaluation area, and calculating a focus evaluation value in the focus evaluation area;

choosing an image with the highest focus evaluation value; and recording the chosen image, further comprising;

before recording the chosen image for recording, displaying the chosen image for recording on a display device; and allowing a user to choose whether or not to record the image for recording being displayed on the display device, wherein the image for recording being displayed on the display device is recorded only when the user chooses to record the image.

9. The image-taking method according to claim 8, further comprising;

when the user chooses not to record the image, choosing an image for recording with the second highest focus evaluation value from among the plurality of images for recording taken;

displaying the chosen image for recording on the display device; and allowing the user to choose whether or not to record the image for recording being displayed on the display device, wherein the image for recording being displayed on the display device is recorded only when the user chooses to record the image.

10. An image-taking apparatus which takes an image with an imaging device in response to an image-taking instruction and records the taken image in a memory for recording, comprising:

an imaging control device which causes the imaging device to take a plurality of images for recording at once with different focus positions on the basis of an instruction of actual shooting;

a memory for temporal storage that temporarily stores the plurality of images for recording taken at once by the imaging device:

a face or eye detecting device which detects a human face or eye in a reference image being a particular image among the plurality of images for recording recorded on the memory for temporal storage after all the multiple images for recording are taken and all the taken images for recording are recorded in the memory for temporal storage;

a focus evaluation area setting device which sets an area enclosing the human face or eye detected by the face or eye detecting device in the reference image as a focus evaluation area;

a focus evaluation value calculating device which calculates a focus evaluation value in the focus evaluation area set by the focus evaluation area setting device in each of the plurality of images for recording recorded on the memory for temporal storage;

an image choosing device which chooses an image for recording with the highest focus evaluation value from among the plurality of images for recording recorded on the memory for temporal storage; and a recording control device which records the image chosen by the image choosing device in the memory for recording.

11. The image-taking apparatus according to claim 10, further comprising:
a motion vector detecting device which detects an motion vector for each image; and
a correcting device which corrects a focus evaluation area set in each image or each whole image on the basis of the motion vector detected by the motion vector detecting device.

12. The image-taking apparatus according to claim 11, wherein
the motion vector detecting device detects a motion vector for each image by feature point tracking.

13. The image-taking apparatus according to claim 11, wherein
the motion vector detecting device comprises a shake detecting device detecting a shake of the image-taking apparatus and calculates the motion vector for each image on the basis of an output from the shake detecting device.

14. An image-taking apparatus which takes an image with an imaging device in response to an image-taking instruction and records the taken image in a memory for recording, comprising:
an imaging control device which causes the imaging device to take a plurality of images for recording at once with different focus positions in response to an instruction for actual shooting;
a memory for temporal storage that temporarily stores the plurality of images for recording taken at once by the imaging device;
a face or eye detecting device which calculates an evaluation value representing the likelihood of being a face or eye to detect a human face or eye in each of the plurality of images for recording recorded in the memory for temporal storage after all the multiple images for recording are taken and all the taken images for recording are recorded in the memory for temporal storage;
a focus evaluation area setting device which calculates a weighted average of the evaluation values representing the likelihood of being a face or eye for each human face or eye detected by the face or eye detecting device, chooses a human face or eye with the highest weighted average of the evaluation values representing the likelihood of being a face or eye, sets an area enclosing the human face or eye in a reference image being a particular image among the plurality of images for recording recorded in the memory for temporal storage, as a focus evaluation area;
a focus evaluation value calculating device which calculates a focus evaluation value in the focus evaluation area set by the focus evaluation area setting device in each of the plurality of images for recording recorded in the memory for temporal storage;
an image choosing device which chooses an image for recording with the highest focus evaluation value from among the plurality of images for recording recorded in the memory for temporal storage; and
a recording control device which records the image for recording chosen by the image choosing device in the memory for recording.

15. An image-taking apparatus which takes an image with an imaging device in response to an image-taking instruction and records the taken image in a a memory for recording, comprising an imaging control device which causes the imaging device to take a plurality of images for recording at once with different focus positions;
a memory for temporal storage that temporarily stores the plurality of images for recording taken at once by the imaging device;
a face or eye detecting device which calculates an evaluation value representing the likelihood of being a face or eye to detect a human face or eye in each of the plurality of images recorded in the memory of temporal storage after all the multiple images for recording are taken and all the taken images for recording are recorded in the memory for temporal storage;
a focus evaluation area setting device which chooses human faces or eyes with the highest evaluation value representing the likelihood of being a face or eye from among human faces or eyes detected by the face or eye detecting device, chooses a human face or eye being chosen the most times, and sets an area enclosing the human face or eye in a reference image being a particular image among the plurality of images for recording recorded in the memory of temporal storage, as a focus evaluation area;
a focus evaluation value calculating device which calculates a focus evaluation value in the focus evaluation area set by the focus evaluation area setting device in each of the plurality of images for recoding recorded in the memory of temporal storage;
an image choosing device which chooses an image for recording with the highest focus evaluation value from among the plurality of images for recording recorded in the memory of temporal storage; and
a recording control device which records the image for recoding chosen by the image choosing device in the memory for recording.

16. An image-taking apparatus which takes an image with an imaging device in response to an image-taking instruction and records the taken image in a memory for recording, comprising:
an imaging control device which causes the imaging device to take a plurality of images for recording at once with a different focus positions in response to an instruction for actual shooting;
a memory for temporal storage that temporarily stores the plurality of images for recording taken at once by the imaging device;
a face or eye detecting device which calculates an evaluation value representing the likelihood of being a face eye from a reference image being a particular image among the plurality of images for recording recorded in the memory for temporal storage, after all the multiple images for recording are taken and all the taken images for recording are recorded in the memory for temporal storage to detect a human face or eye;
a focus evaluation area setting device which chooses a human face or eye with the highest evaluation value representing the likelihood of being a face or eye among human faces or eyes detected by the human face or eye detecting device and sets an area enclosing the human face or eye in the reference image as a focus evaluation area;
a focus area evaluation value calculating device which calculates a focus evaluation value in the focus evaluation area set by the focus evaluation area setting device in each of the plurality of images for recording recorded in the memory for temporal storage;

an image choosing device which chooses an image for recording with the highest focus evaluation value from among the plurality of images for recording recorded in the memory for temporal storage; and a recording control device which records the image for recording chosen by the image choosing device in the memory for recording.

17. An image-taking apparatus which takes an image by using an imaging device in response to an image-taking instruction and records the taken image in a storage medium, comprising;

an imaging control device which causes the imaging device to take a plurality of images with different focus positions in response to a single image-taking instruction;

a face or eye detecting device which detects a human face or eye in each of the images taken in response to the single image-taking instruction;

a focus evaluation area setting device which sets an area enclosing a human face or eye detected by the face or eye detecting device as a focus evaluation area in each of the images taken in response to the single image-taking instruction;

a focus evaluation value calculating device which calculates a focus evaluation value in the focus evaluation area set by the focus evaluation area setting device in each of the images taken in response to the single image-taking instruction;

an image choosing device which chooses an image with the highest focus evaluation value from among the plurality of images taken in response to the single image-taking instruction; and a recording control device which records the image chosen by the image choosing device in the storage medium, further comprising:

a display device which displays an image;

a display control device which causes the display device to display an image for recording chosen by the image choosing device before recording the chosen image with the image choosing device; and an instruction device which instructs whether or not to record the image for recording being displayed on the display device, wherein the recording control device records the image being displayed on the display device in the memory for recording only when the image-taking apparatus is instructed to record the image for recording by the instruction device.

18. The image-taking apparatus according to claim 17, wherein when the image-taking apparatus is instructed not to record the image by the instruction device, the image choosing device chooses an image with the second highest focus evaluation value from among the plurality of images for recording taken in response to the single image-taking instruction;

the display control device causes the display device to display the image for recording chosen by the image choosing device; and the recording control device records the image being displayed on the display device in the memory for recording only when the image-taking apparatus is instructed to record the image for recording by the instruction device.

\* \* \* \* \*